United States Patent
Batard

(10) Patent No.: US 10,999,586 B2
(45) Date of Patent: May 4, 2021

(54) IMAGE ENCODING METHOD AND EQUIPMENT FOR IMPLEMENTING THE METHOD

(71) Applicant: ATEME, Velizy Villacoublay (FR)

(72) Inventor: Olivier Batard, Velizy Villacoublay (FR)

(73) Assignee: ATEME, Velizy Villacoublay (FR)

( * ) Notice: Subject to any disclaimer, the term of this patent is extended or adjusted under 35 U.S.C. 154(b) by 353 days.

(21) Appl. No.: 15/759,039

(22) PCT Filed: Sep. 15, 2016

(86) PCT No.: PCT/EP2016/071875
§ 371 (c)(1),
(2) Date: Mar. 9, 2018

(87) PCT Pub. No.: WO2017/046273
PCT Pub. Date: Mar. 23, 2017

(65) Prior Publication Data
US 2020/0228810 A1      Jul. 16, 2020

(30) Foreign Application Priority Data
Sep. 17, 2015   (FR) ...................................... 15 58768

(51) Int. Cl.
*H04N 19/433*      (2014.01)
*H04N 19/176*      (2014.01)
*H04N 19/533*      (2014.01)

(52) U.S. Cl.
CPC ......... *H04N 19/433* (2014.11); *H04N 19/176* (2014.11); *H04N 19/533* (2014.11)

(58) Field of Classification Search
None
See application file for complete search history.

(56) References Cited

U.S. PATENT DOCUMENTS

| | | | | |
|---|---|---|---|---|
| 2010/0266043 A1* | 10/2010 | Huang | ................ | H04N 19/433 375/240.16 |
| 2011/0228851 A1 | 9/2011 | Nusboim et al. | | |
| 2013/0136181 A1* | 5/2013 | Amitay | ................ | H04N 19/533 375/240.16 |

FOREIGN PATENT DOCUMENTS

WO      2010/124736 A1      11/2010

OTHER PUBLICATIONS

Gary J. Sullivan, "Overview of the High Efficiency Video Coding (HEVC) Standard", IEEE Transactions on Circuits and Systems for Video Technology, vol. 22, No. 12, Dec. 2012, pp. 1649-1668.
(Continued)

*Primary Examiner* — William C Vaughn, Jr.
*Assistant Examiner* — Joseph Daniel A Towe
(74) *Attorney, Agent, or Firm* — Nixon & Vanderhye

(57) ABSTRACT

To encode an image divided into blocks of a set of images, each block being encoded according to one of a plurality of encoding modes including at least one temporal correlation prediction encoding mode utilizing a plurality of images, a motion estimation vector search area is defined in a second image of the set of images, distinct from the first image and previously encoded according to a predefined sequence of encoding images of the set of images, a portion at least of the search area having substantially the shape of an ovoid, the data from the search area is stored in a cache memory, a motion estimation vector of the current block is determined by a search in the search area in the cache memory, and the motion estimation vector is used to decide the encoding of the current block according to the one of the plurality of encoding modes.

20 Claims, 17 Drawing Sheets

(56) References Cited

OTHER PUBLICATIONS

International Search Report, dated Nov. 9, 2016, from corresponding PCT/EP2016/071875 application.
International Telecommunication Union, Series H: Audiovisual and Multimedia Systems, "H.264, Advanced video coding for generic audiovisual Services," Mar. 2009.

* cited by examiner

■ Pixel of candidate vector
☐ Pixels of test vectors

Time T₁ of the encoding

Time T₂ of the encoding

▨ Blocks co-located with the blocks encoded in parallel
▦ Reference image data loaded into the cache ☐ Blocks co-located with the blocks encoded in parallel
▨ Reference image data loaded into the cache

IMAGE ENCODING METHOD AND EQUIPMENT FOR IMPLEMENTING THE METHOD

The present invention relates to an image encoding method and a device for implementing this method. It is particularly applicable to the coding of images of a video stream.

BACKGROUND OF THE INVENTION

Video data are generally subjected to source encoding intended to compress them in order to reduce the resources required for their transmission and/or storage. There are many coding standards which can be used for this purpose, such as H.264/AVC, H.265/HEVC, and MPEG-2.

Consider a video stream comprising a set of images. In conventional coding schemes, the images of the video stream to be encoded are typically considered according to an encoding sequence, and each is divided into sets of pixels which are also processed sequentially, for example starting at the top left and ending at the bottom right of each image.

An image of the stream is thus encoded by dividing a matrix of pixels corresponding to the image into several sets, for example blocks of fixed size (16×16, 32×32, or 64×64 pixels), and encoding these blocks of pixels according to a given processing sequence. Some standards, such as H.264/AVC, provide the possibility of dividing blocks of size 16×16 pixels (which are then called macroblocks) into sub-blocks, for example of size 8×8 or 4×4, in order to perform the encoding processing with finer granularity. The H.265/HEVC standard provides for the use of fixed-size blocks of up to 64×64 pixels, and the blocks can be partitioned down to a minimum size of 8×8 pixels.

Existing video compression techniques can be divided into two broad categories: the compression called "Intra", in which the compression processing is performed on the pixels of a single image or video frame, and the compression called "Inter", where the compression processing is carried out on multiple images or video frames. In Intra mode, the processing of a block (or set) of pixels typically includes predicting the pixels of the block, performed using causal (previously encoded) pixels present in the image being encoded (referred to as the "current image"), in which case the term "Intra prediction" is used. In Inter mode, the processing of a block (or set) of pixels typically includes predicting the pixels of a block by using pixels from one or more previously encoded images, in which case the term "Inter prediction" or "motion compensation" is used.

These two types of coding are used in coding schemes referred to as "hybrids", which are specified in existing video codecs (MPEG2, H.264/AVC, HEVC) and are described for the HEVC (High Efficiency Video Coding) codec in the article entitled "Overview of the High Efficiency Video Coding (HEVC) standard," by Gary J. Sullivan et al., IEEE Transactions on Circuits and Systems for Video Technology, vol. 22, No. 12, December 2012.

This exploitation of spatial and/or temporal redundancies eliminates having to transmit or store the value of the pixels of each block (or set) of pixels, by representing at least some of the blocks by a pixel residual representing the difference (or distance) between the prediction values of the pixels in the block and the actual values of the pixels in the predicted block.

The pixel residual information is present in the data generated by the encoder after transformation (for example a discrete cosine transform, or DCT) and quantization in order to reduce the entropy of the data generated by the encoder.

It is desirable to minimize the additional information generated by the pixel prediction which is output from the encoder in order to increase the efficiency of a coding/compression scheme at a given level of distortion. Conversely, we can also aim to reduce this additional information in order to increase the effectiveness of a coding/compression scheme at a given bit rate output from the encoder.

A video encoder typically chooses an encoding mode corresponding to a selection of encoding parameters for a set of processed pixels. This decision can be implemented by optimizing a rate and distortion metric, the encoding parameters selected by the encoder being those which minimize a rate-distortion criterion. The choice of encoding mode then has an impact on encoder performance, both in terms of rate gain and visual quality.

A video encoder which is desired to have real-time processing performance can be implemented as a combination of hardware and software, such as a software program to be loaded and executed on an FPGA component (Field Programmable Gate Array), or as a dedicated hardware architecture such as an ASIC (Application Specific Integrated Circuit). Programmable logic circuits such as FPGA (Field-Programmable Gate Array) are electronic circuits that are reconfigurable by the user. An ASIC is a specialized electronic circuit that groups features tailored to a given application.

An encoder can also use hybrid architectures, such as architectures based on a CPU+FPGA, a GPU (Graphics Processing Unit), or an MPPA (Multi-Purpose Processor Array).

One advantage of implementing a real-time video encoder in an FPGA component lies in the ability to design the processing algorithms so that some of the processing is performed in parallel. There are fewer possibilities for this type of optimization in implementations of a real-time video encoder in digital signal processors (DSP), which are generic components operating with linear software code executed sequentially in the DSP.

However, video encoders implemented on a dedicated component are often limited, especially those that perform parallel processing, by the bandwidth available for the data transfer between the component and an external memory that stores the data of the video stream to be encoded. This limitation is usually overcome by implementing a cache memory located in the component, which thus has a much higher bandwidth than an external memory.

Using a cache, however, requires adapting the encoding algorithms to involve the cache in a manner that best exploits the benefits afforded by the use of a cache to reduce the processing time while improving the compression quality of the encoded video stream.

Depending on the type of cache used, various limitations are imposed on the encoder. Generally, they result in limiting the motion estimation algorithms allowed by the encoder.

There is therefore a need for an image encoding method using a cache memory that is improved in terms of acceleration of the processing time and compression quality.

SUMMARY OF THE INVENTION

An object of the present invention is to provide an image encoding method using a cache memory that is improved in terms of acceleration of the processing time and compression quality.

Another object of the present invention is to provide an image encoding method using a cache memory that is improved in terms of acceleration of the processing time and compression quality, for a real-time implementation.

Another object of the present invention is to provide an image encoding method using a cache memory for a real-time implementation.

According to a first aspect, a method is proposed for encoding a first image in a set of images, wherein the first image is divided into blocks, each block being encoded according to one among a plurality of coding modes comprising at least one prediction by temporal correlation coding mode utilizing a plurality of images from the set of images, the method comprising, for a current block of the first image: defining, in a second image of the set of images that is distinct from the first image and previously encoded according to a predefined encoding sequence for the images of the set of images, a single search area for motion estimation vectors; loading the data of the single search area into a cache memory; determining a motion estimation vector of the current block by searching the single search area loaded in the cache memory, the motion estimation vector pointing to a block of the search area correlated to the current block; and using the motion estimation vector to decide the encoding of the current block according to one among the plurality of coding modes; wherein the single search area comprises a set of data of the second image comprising the data of a block of the second image that is co-located with the current block, and wherein at least a portion of the single search area has substantially the shape of an ovoid portion.

The proposed method allows optimizing the shape of the search area to be loaded into the cache, in a manner that minimizes the amount of data loaded into the cache and not used in subsequent processing, such as processing related to motion estimation or motion compensation.

In one embodiment of the proposed method, the single search area has a substantially ovoid shape.

The optimization of the search area related to the ovoid shape can in fact be advantageously applied to the entire search area, and not simply to a portion thereof.

In one or more embodiments of the proposed method, the single search area may also be determined so that at least a portion of the single search area has substantially the shape of an ellipsoid portion.

The ellipsoid shape advantageously makes it possible to increase the displacement of the vector components without increasing the complexity of the implementation or using significant additional resources.

This embodiment of the proposed method has the advantage of increasing, for the same memory space, the displacement of the components of the motion vectors without losses due, where such applies, to the shape configuration of the blocks of the group of encoding blocks intended to be encoded in parallel.

In one embodiment of the proposed method, the single search area may be determined as having a substantially ellipsoid shape.

In one embodiment of the proposed method, the single search area may be determined with an outline that defines a polygon of substantially elliptical shape.

The proposed method may advantageously further be applied to the case of a group of encoding blocks to be encoded in parallel, for example a group of 2, 3, or 4 encoding blocks.

In one embodiment of the proposed method, a multiple search area is thus defined for a plurality of encoding blocks by combining single search areas respectively corresponding to the encoding blocks of the plurality of encoding blocks; data of the multiple search area is loaded into the cache memory; by searching the multiple search area loaded in the cache memory, a plurality of estimation vectors respectively corresponding to the encoding blocks of the plurality of encoding blocks is determined; and the determined estimation vectors are used to encode the encoding blocks of the plurality of encoding blocks.

The proposed method may further be adapted to different shape configurations of the blocks of the group of encoding blocks to be encoded in parallel, for example the MBAFF configuration of H.264 encoders ("MacroBlock-Adaptive Frame/Field coding").

According to a second aspect, a device for encoding a first image in a set of images is provided, comprising: an input interface configured for receiving the first image; and a video encoding unit operatively coupled to the input interface and configured to encode the first image by using the proposed method.

According to another aspect, a computer program is provided, loadable into a memory associated with a processor, and comprising portions of code for implementing the steps of the proposed method when said program is executed by the processor, as well as a set of data representing, for example by way of compression or encoding, said computer program.

Another aspect relates to a non-transitory storage medium for a program executable by a computer, comprising a set of data representing one or more programs, said one or more programs comprising instructions which, during the execution of said one or more programs by a computer comprising a processing unit operatively coupled to memory means and to an input/output interface module, cause the computer to encode a first image in a set of images according to the proposed method.

The proposed method is particularly, although not exclusively, suitable for encoding or compressing an image of an image sequence according to a H.264/AVC (Advanced Video Coding) scheme. But it is also suitable for encoding images according to any video encoding scheme applied to images divided into blocks in which the blocks are encoded according to a plurality of coding modes including at least one prediction by temporal correlation type of coding mode utilizing a plurality of images from the video stream to be encoded, such as an H.265/HEVC encoding scheme.

The proposed method can advantageously be implemented in cases where the prediction by temporal correlation type of coding mode utilizing a plurality of images from the set of images is of the type utilizing motion prediction based on previously encoded images (type of coding mode referred to in some video encoders as "Inter") or of the type utilizing a predetermined predictor vector selected based on previously encoded neighboring blocks of the current block (types of coding mode referred to in some video encoders as "Skip" and "Merge").

BRIEF DESCRIPTION OF THE DRAWINGS

Other features and advantages of the invention will become apparent from the following description of some examples of non-limiting embodiments, with reference to the accompanying drawings in which:

FIGS. 3a, 3b, and 3c are diagrams illustrating Intra prediction modes;

DETAILED DESCRIPTION OF THE PREFERRED EMBODIMENTS

In the following detailed description of some embodiments of the invention, many specific details are presented for more complete understanding. However, the skilled person will appreciate that some embodiments can be implemented without these specific details. In other cases, well-known features are not described in detail in order to avoid unnecessarily complicating the description.

In what follows, the terms "pixel" and "sample" are used interchangeably to designate an element of a digital image.

The proposed method can be implemented by any type of encoder of images in a set of images, such as a video codec in accordance with the H.264/AVC, H.265/HEVC, and/or MPEG-2 standards.

In particular, the various embodiments described below for an H.264/AVC type encoder using macroblocks (MB) of 16×16 pixels can be adapted to an H.265/HEVC type encoder by replacing the 16×16 MB with CTB16, CTB32, and CTB64 blocks respectively of sizes 16×16, 32×32, and 64×64, defined by the HEVC standard.

Figure 1:
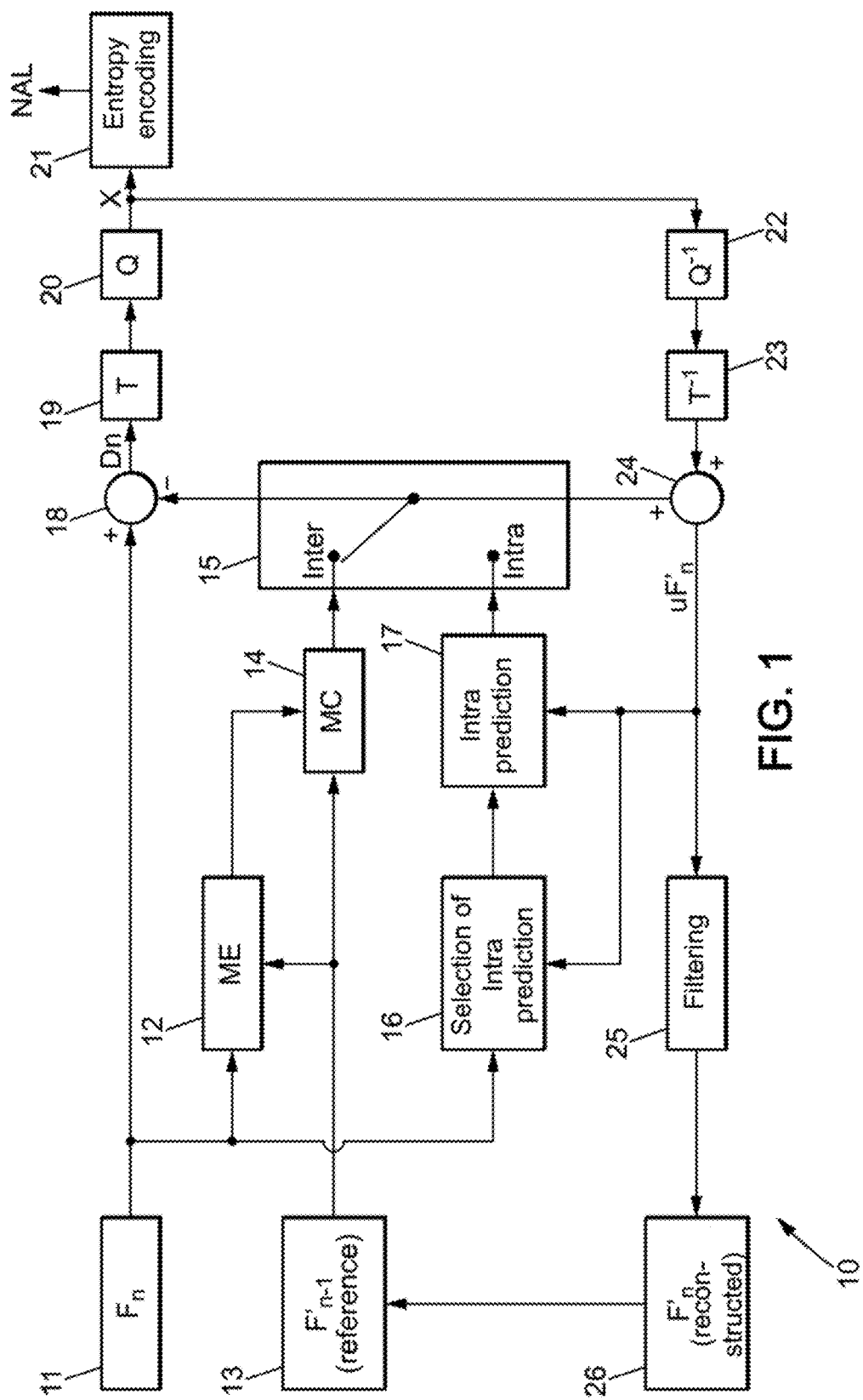
FIG. 1 is a diagram illustrating an H.264/AVC encoder.

FIG. 1 illustrates an exemplary architecture of a H.264/AVC encoder (10).

A stream F of images to encode ($F_n$) is input to the encoder (10). Each image $F_n$ (11) of the input stream is divided into macroblocks of 16×16 pixels, to be encoded in a predetermined sequence for encoding macroblocks, for example from top to bottom and left to right.

The macroblocks are predicted using causal (previously encoded) pixels present in the current image ("Intra" prediction), or by using pixels from one or more previously encoded images ("Inter" prediction). This exploitation of spatial and temporal redundancies allows representing the coding units by the smallest possible pixel residual which is then transmitted to the decoder, possibly after transformation and quantization.

Each macroblock to be encoded is input to a motion estimation unit (12) ("ME"), which generates data relating to the motion of the block being encoded relative to one or more previously encoded images $F'_{n-1}$ (13), commonly called reference images, which are also input to the motion estimation unit (12). The motion data produced by the motion estimation unit are supplied to a motion compensation unit (14) (or Inter type prediction) ("MC" for "Motion Compensation"), which also receives as input the reference image or images used by the motion estimation unit (12). The motion compensation unit (14) generates Inter prediction data which are supplied to an encoding decision unit (15).

The data of the block to be encoded are also supplied to an Intra prediction selection unit (16), which evaluates various neighboring blocks of the block to be encoded in the current image within a context of Intra prediction. The Intra prediction selection unit (16) generates, as input for an Intra prediction unit (17), data of one or more neighboring blocks of the current block (being encoded) for the Intra prediction, and the Intra prediction unit (17) in turn produces Intra prediction data, which are supplied to the encoding decision unit (15) which selects an Inter or Intra type prediction based on the prediction data received for these two modes. The Intra prediction selection unit (16) and the Intra prediction unit (17) receive encoded image data $uF'_n$ as input.

A determination (18) of the residual $D_n$ is performed using data of the current image (for the current block) $F_n$ and the prediction data selected by the encoding decision unit (15). This pixel residual is then processed by transformation (T) (19) and quantization (Q) (20), and the quantized data (X) are encoded by entropy encoding (21) in order to generate an encoded stream (NAL).

A loop for reconstructing images from encoding data retrieves the quantized data (X) for processing in inverse operations of quantization ($Q^{-1}$) (22) and transformation ($T^{-1}$) (23). An inverse operation (24) to that of determining the residual is further applied in order to reconstruct the blocks already encoded $uF'_n$, and which will be used to provide the Intra prediction units with data of neighboring blocks of the block being encoded. These data will then be filtered (25) for the reconstruction of entire images (26) $F'_n$, which will provide the reference images for the Inter prediction units.

Figure 2:
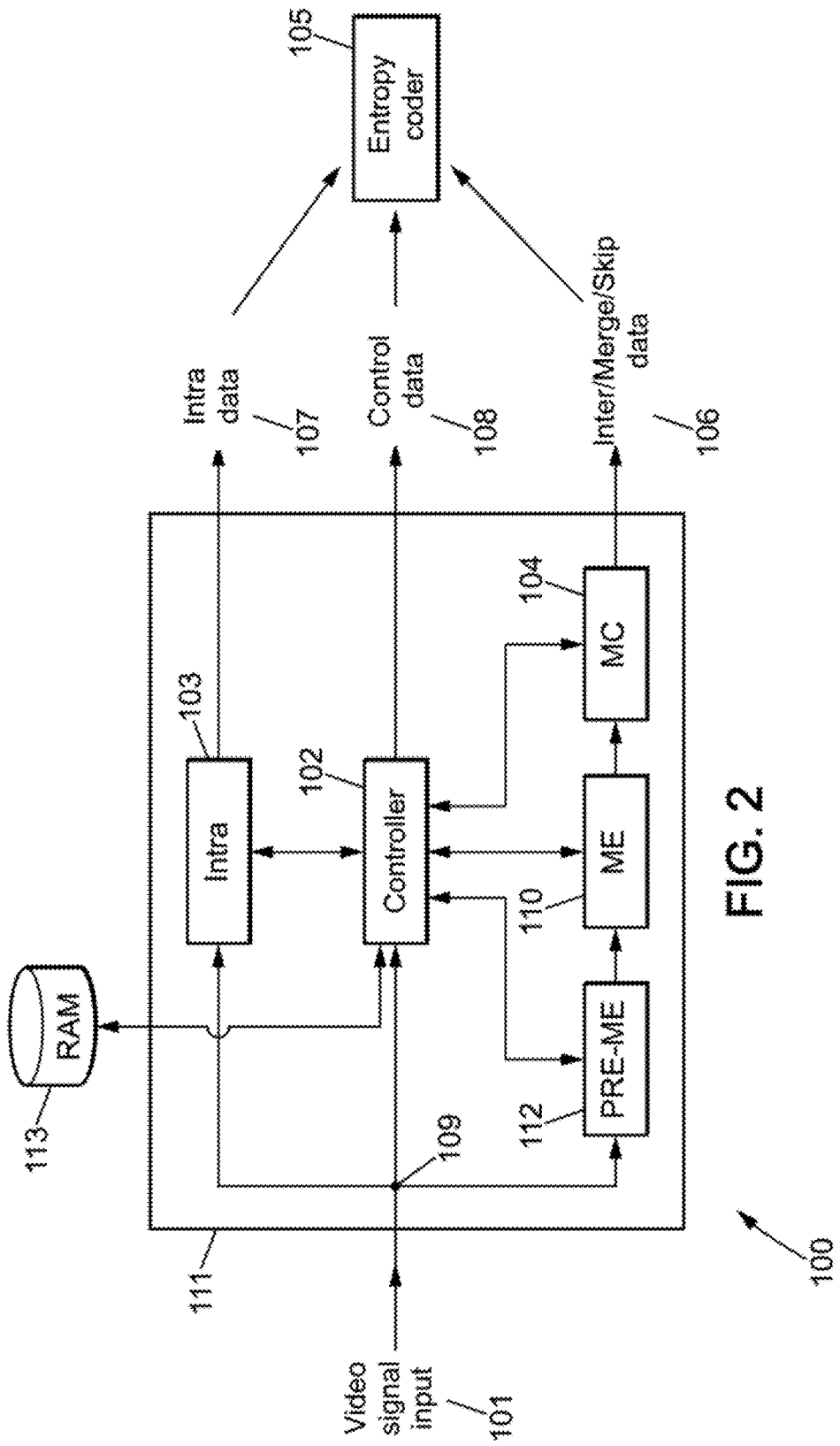
FIG. 2 is a diagram illustrating the architecture of a coder implementing the proposed method.

In the architecture of an encoder illustrated in FIG. 2, the images are considered sequentially and divided into sets of pixels processed sequentially starting at the top left and ending at the bottom right. These sets of pixels are called "coding units" in the HEVC standard, and their maximum size is 64×64 pixels, coding units of this size being called "Large Coding Units" or "LCU". These sets of pixels are predicted using causal (previously coded) pixels present in the current image ("Intra" prediction), or using pixels from one or more previously encoded images ("Inter" prediction). This exploitation of spatial and temporal redundancies enables representing the coding units by the smallest possible pixel residual which is then transmitted to the decoder, possibly after transformation and quantization.

Referring to FIG. 2, the encoder 100 receives as input 109 an input video stream 101 comprising a plurality of images to be processed in order to encode the stream. The encoder 100 comprises a controller 102, operatively coupled to the input interface 109, which controls a motion pre-estimation unit (PRE-ME) 112, a motion estimation unit (ME) 110, and a prediction by motion compensation unit (MC) 104 for Inter, Merge, and/or Skip type predictions (described below), as well as an Intra mode prediction unit 103. The data received at the input interface 109 are inputted to the Intra mode prediction unit 103, motion pre-estimation unit 112, and controller 102. The controller 102, motion estimation unit 110, prediction unit 104 for Inter, Merge, and Skip predictions, and Intra mode prediction unit 103 together form an encoding unit 111 operatively coupled to the input interface 109. The encoding unit 111 is also operatively coupled to a memory unit 113, for example RAM, via the controller 102 in the example shown in FIG. 2.

The Intra mode prediction unit 103 generates Intra prediction data 107 which are input to an entropy coder 105. The motion pre-estimation unit 112 generates, for an encoding block, a list of potential candidate vectors for the Inter decision, supplied to the motion estimation unit 110. The motion estimation unit 110 and the Inter/Merge/Skip mode prediction unit 104 refine the potential candidate vectors then select a better candidate. The Inter/Merge/Skip mode prediction unit 104 generates Inter, Merge, or Skip prediction data 106 which are input to the entropy coder 105. For example, data supplied to the decoder for an Inter type prediction may include a pixel residual and information concerning one or more motion vectors. This information relating to one or more motion vectors may comprise one or more indexes identifying a predictor vector in a list of predictor vectors known to the decoder. The data provided to the decoder for a Skip type prediction typically will contain no pixel residual, and may also include information identifying a predictor vector in a list of predictors known to the decoder. The list of predictor vectors used for Inter type coding will not necessarily be identical to the list of predictor vectors used for Skip type coding. The controller 102 generates control data 108 which are also input to the entropy coder 105.

The controller 102 is configured to control the Intra mode prediction unit 103 and the Inter/Merge/Skip mode prediction unit 104 in order to control the prediction data which are respectively input to the entropy encoder 105 by the Intra mode prediction unit 103 and the Inter/Merge/Skip mode prediction unit 104. Depending on the encoding scheme implemented by the encoder 100, the controller 102 may further be configured to select, among the different types of prediction mode (Intra mode, Inter mode, Merge mode, or Skip mode depending on the coding modes implemented in the encoding unit 111), the one for which the prediction data will be transmitted to the entropy coder 105. Thus, the encoding scheme may include a decision for each processed encoding block, choosing the type of prediction for which data will be transmitted to the entropy coder 105. This choice will typically be implemented by the controller, to decide whether to apply Inter prediction mode, Intra prediction mode, Merge prediction mode, or Skip prediction mode to the block (or the coding unit) during processing. This allows controlling the sending of Intra prediction data 107 or of Inter, Merge, or Skip prediction data 106 to the entropy coder, according to the decision made by the controller 102.

The encoder 100 may be a computer, a computer network, an electronic component, or some other device having a processor operatively coupled to a memory, as well as, depending on the embodiment chosen, a data storage unit, and other associated hardware such as a network interface and a media reader for reading a removable storage medium and writing to such a medium (not shown in the figure). The removable storage medium can be, for example, a compact disc (CD), a digital video/versatile disc (DVD), a flash drive, a USB key, etc. Depending on the embodiment, the memory, the data storage unit, or the removable storage medium contains instructions which, when executed by the controller 102, cause the controller 102 to carry out or to control the input interface 109, Intra mode prediction 103, Inter/Merge/Skip mode prediction 104, motion pre-estimation 112, motion estimation 110, and/or data processing portions of the exemplary implementations of the proposed method described herein. The controller 102 may be a component implementing a processor or a computing unit for encoding images according to the proposed method and for controlling units 109, 110, 112, 103, 104, 105 of the encoder 100.

The encoder 100 may be implemented as software, as described above, in which case it takes the form of a program executable by a processor, or may be implemented as hardware, such as an application specific integrated circuit (ASIC) or a system on chip (SOC), or may be implemented as a combination of hardware and software, such as a software program to be loaded and executed on an FPGA (Field Programmable Gate Array) component. SOCs (System On Chip) are embedded systems that integrate all components of an electronic system into a single chip.

An encoder may also use hybrid architectures, for example such as architectures based on a CPU+FPGA, a GPU (Graphics Processing Unit), or an MPPA (Multi-Purpose Processor Array).

The image being processed is divided into encoding blocks or coding units (CU) whose shape and size are determined according to the size of the pixel matrix representing the image, for example square macroblocks of 16×16 pixels. This forms a set of blocks for which a processing sequence is defined (also called "processing path"). In the case of square blocks, one may for example process the blocks of the current image starting with the one at the top left of the image, followed by the one to the immediate right of the preceding one, until the end of the first row of blocks is reached, then advancing to the leftmost block in the row of blocks immediately below this first row, ending the processing with the lowermost and rightmost block of the image.

One is thus working with a "current block" (sometimes referred to as the "original block"), meaning an encoding block currently being processed in the current image. Processing of the current block may comprise partitioning the block into sub-blocks in order to process the block with at finer spatial granularity than is obtained with the block. Processing of a block also includes predicting the pixels in the block, by exploiting the spatial (in the same image) or temporal (in one or more previously encoded images) correlation between pixels. When several types of prediction, such as an Intra prediction type, an Inter prediction type, a Merge prediction type, and/or a Skip prediction type are implemented in the encoder, prediction of pixels in the block typically includes selecting a prediction type for the block and prediction information corresponding to the selected type, together forming a set of encoding parameters.

The prediction of the processed block of pixels allows calculating a pixel residual, which corresponds to the difference between the pixels of the current block and the pixels of the prediction block, and is transmitted in some cases to the decoder after transformation and quantization.

Several coding modes are thus possible for coding a current block, and it is necessary to include, in the data generated by the encoding, coding information 106-108 indicating the choice of coding mode that was made during encoding and which was used to encode the data. This coding information 106-108 may include the coding mode (for example the particular type of predictive coding among "Intra" and "Inter" coding, or among "Intra", "Inter", "Merge", and "Skip" coding described below), the partitioning (in the case of one or more blocks partitioned into sub-blocks), as well as the motion information 106 in the case of predictive coding that is of the "Inter", "Merge", or "Skip" type and an Intra prediction mode 107 in the case of an "Intra" type predictive coding. For the "Inter", "Skip", and "Merge" coding modes, the latter two pieces of information can also be predicted in order to reduce their coding cost, for example using information from the neighboring blocks of the current block.

The HEVC standard uses a quadtree coding structure, described below, combined with dynamic selection of the main block size. HEVC allows partitioning each current image into blocks of sizes ranging from 64×64 pixels to 8×8 pixels. The video stream to be encoded can thus be scanned in blocks of 64×64, each block of size 64×64 able to be divided into blocks of smaller size (the smallest allowed subdivision being 8×8 blocks which are each 8×8 pixels in size). The encoder typically selects the block size used based on proprietary criteria that are not defined by the standard.

The video encoder may also use a YCbCr representation of the color space of the video signals, with a sampling rate which may be 4:2:2 or 4:2:0 (color subsampling). The video signal to be encoded carries luminance information (Y signal) and two pieces of chrominance information (Cb and Cr signals). The samples of each component (Y, Cb, Cr) may be coded in 8 bits, 10 bits, or more.

In 4:2:2 sampling, an area of size H×L luminance pixels (or samples) is of size H/2×L for each chrominance component, which amounts to color subsampling in the horizontal direction only. The 4:2:2 representation corresponds to the SDI signal format (System Deployment Image).

In 4:2:0 sampling, an area of size H×L luminance pixels (or samples) is size H/2×L/2 for each chrominance component, which amounts to color subsampling in the horizontal direction and in the vertical direction.

The following describes examples of "Intra", "Inter", "Merge", and "Skip" prediction modes, in order to improve one's understanding of the implementation of the proposed method for video coding using these prediction modes.

As indicated above, the predictive coding in "Intra" mode includes predicting the pixels of a block (or set) of pixels being processed, based on previously encoded pixels of the current image. There are different "Intra" predictive coding modes, some of which are described below:

In the "Intra" prediction mode called "DC" (for "Discrete Continuous"), the values of neighboring pixels of the current block which belong to blocks which have been previously encoded are used, and the mean of the values of these neighboring pixels is calculated. The predictive block is constructed using for each pixel the mean value obtained.

Figures 3A, 3B:
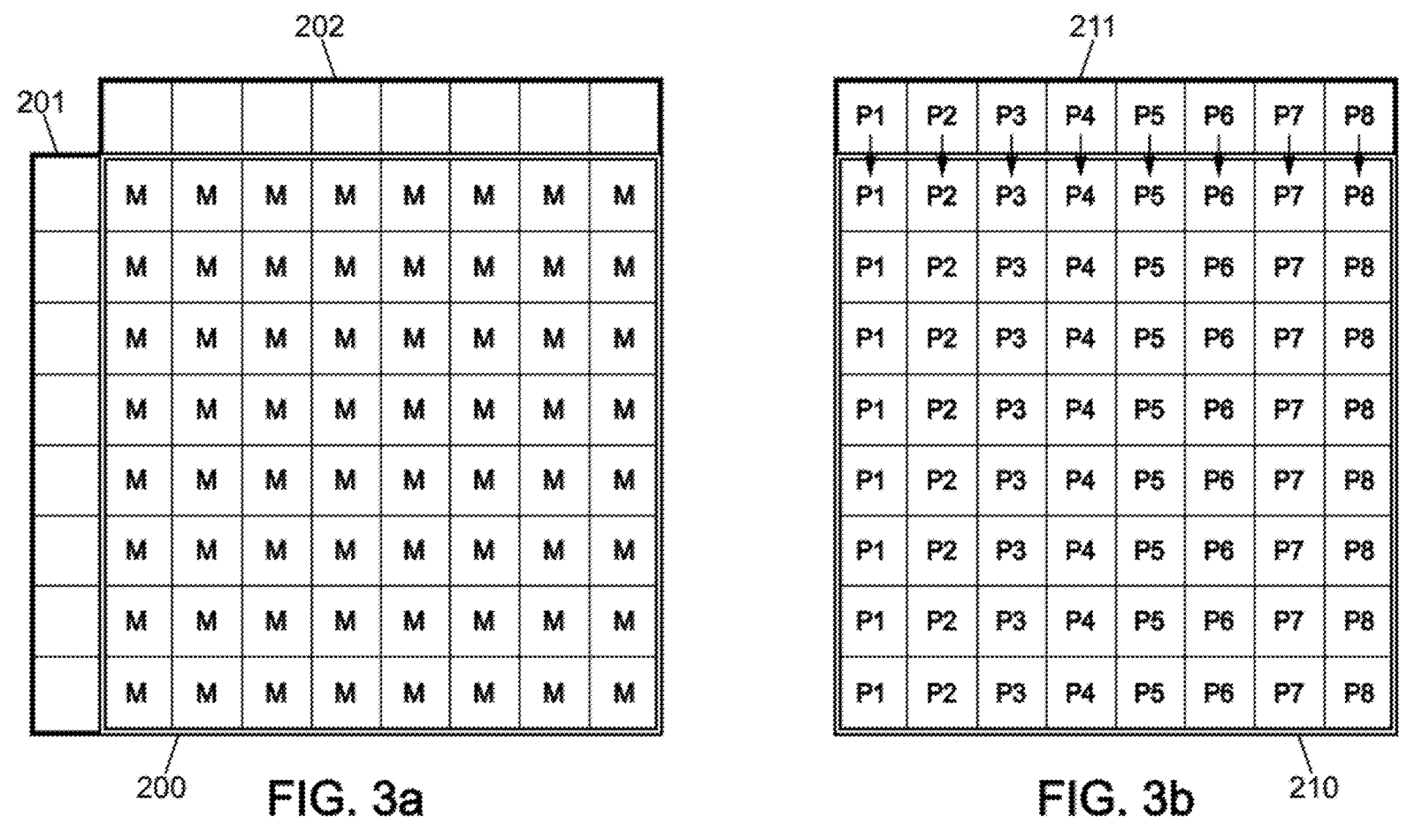

For example, if a block 200 of 8×8 pixels is considered as illustrated in FIG. 3a, the two sets of eight neighboring pixels 201, 202 of the neighboring block located to the left of the current block and of the neighboring block located above the current block are used. A mean value M of the values of these 16 pixels is calculated, which is used to fill in the pixel values of the predictive block 200.

In the "Intra" prediction mode called "V" (for "Vertical"), the values of the neighboring pixels of the current block that belong to the neighboring block located above the current block are used when these neighboring pixels were previously encoded, and the value of each neighboring pixel is copied for the pixels of the corresponding column in the predictive block.

For example, if we consider a block 210 of 8×8 pixels as illustrated in FIG. 3b, we use for example the set of eight neighboring pixels 211 of the neighboring block located to the left of the current block, in the case where the coding path of the block is such that this block has already been encoded. The value of each of the eight neighboring pixels is copied into the corresponding column of the predictive block 210.

In the "Intra" prediction mode called "H" (for "Horizontal"), the values of the neighboring pixels of the current block that belong to the neighboring block located to the left or right of the current block are used when these neighboring pixels were previously encoded, and the value of each neighboring pixel is copied for the pixels of the corresponding row in the predictive block.

In the "Intra" prediction mode called "VL" (for "Vertical-Left"), the values of the neighboring pixels of the current block that belong to the neighboring block located immediately above and to the above right of the current block are used when these neighboring pixels were previously encoded, and the value of each neighboring pixel is copied for the pixels of the corresponding column in the predictive block.

Figure 3C:
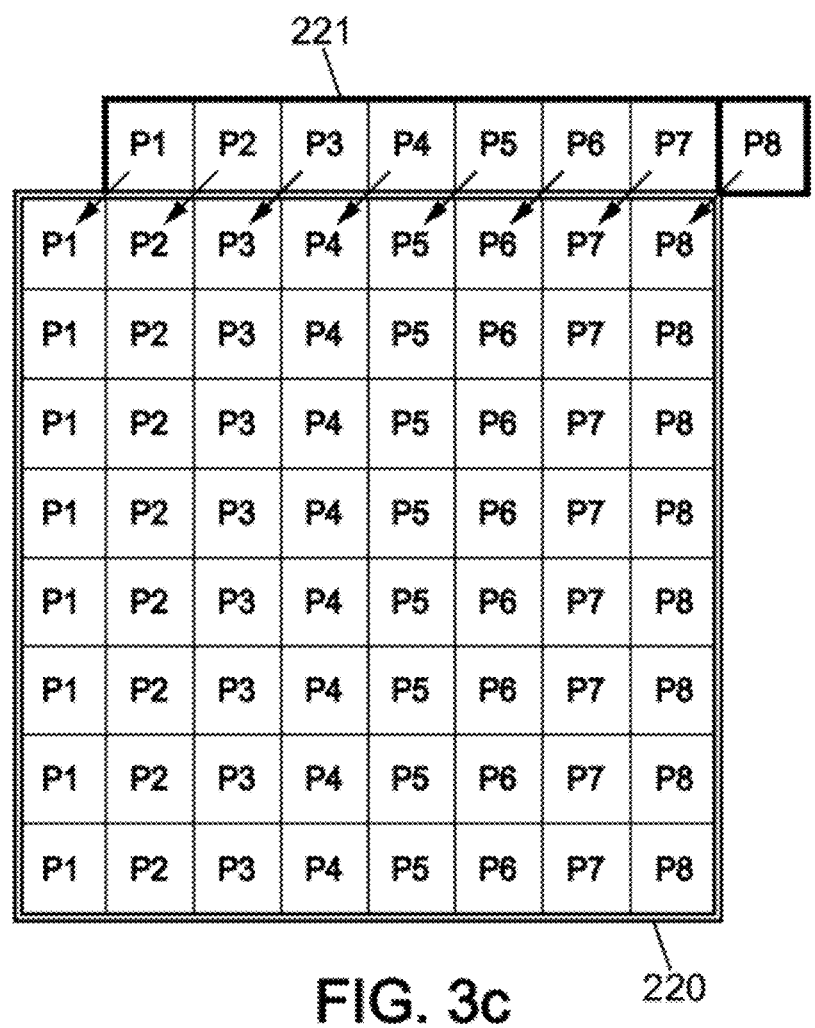

For example, if we consider a block 220 of 8×8 pixels as illustrated in FIG. 3c, we use for example the set of eight neighboring pixels 221 of the two neighboring blocks respectively located immediately above and to the above right of the current block, in the case where the block coding path is such that these neighboring blocks, or at least the neighboring pixels considered, have already been encoded. The value of each of the eight neighboring pixels is copied into the corresponding column of the predictive block 220 in a left diagonal projection as shown in FIG. 3c.

The H.264/AVC video coding standard provides nine Intra prediction modes (including the DC, H, V, VL prediction modes described above). The HEVC video coding standard provides a larger number (35 Intra prediction modes) for luminance samples, and 5 modes for chrominance samples.

These video coding standards also provide special cases for performing Intra prediction. For example, the H.264/AVC standard allows subdividing blocks of 16×16 pixels into smaller blocks of sizes down to 4×4 pixels, in order to increase the processing granularity of the predictive coding.

As indicated above, the Intra prediction mode information is predicted in order to reduce the coding cost. Indeed, transmitting in the encoded stream an index identifying the Intra prediction mode has a higher cost when the number of usable prediction modes is higher. Even in the case of H.264/AVC coding, the transmission of an index between 1 to 9 to identify the Intra prediction mode used for each block among the 9 possible modes turns out to be expensive in terms of coding cost. The HEVC standard provides for determining no more than three predicted Intra modes. If the encoder makes an encoding decision using one of these modes, only information relating to its index (sometimes written "mpm_index") and a flag indicating that one of the predicted modes has been selected is sent by the encoder. Otherwise, the encoder transmits information indicating a deviation from the predicted modes (sometimes denoted "rem_intra_pred_mode").

The most probable mode is thus calculated, denoted MPM, which is used to encode in a minimum amount of bits the most probable Intra prediction mode. The MPM is the result of the prediction of the Intra prediction mode used to encode the current block.

When Intra mode is selected for encoding the current block, typically a set of coefficients corresponding to the transformed and quantized pixel residual and the MPM can be sent to the decoder.

Predictive coding that is prediction by temporal correlation, referred to for some video coders by the name "Inter", includes a prediction of pixels of a block (or set) of pixels being processed, utilizing pixels from one or more previously encoded images (pixels which therefore are not from the current image, in contrast to Intra prediction mode).

Inter prediction mode typically uses one or two sets of pixels, respectively located in one or two previously encoded images, to predict the pixels of the current block. However, it is conceivable for an Inter prediction mode to use more than two sets of pixels respectively located in separate images previously encoded two-by-two and their number being greater than two. This technique, called motion compensation, involves the determination of one or two vectors, called motion vectors, which respectively indicate the position of the set or sets of pixels to be used for prediction in the previously encoded image or images (usually referred to as "reference images"). Referring to FIG. 2, the vectors used for "Inter" mode are selected by the encoder 100 by means of the motion pre-estimation unit 112, the motion estimation unit 110, and the Inter/Merge/Skip mode prediction unit 104. The implementation of motion estimation in the encoder 100 can therefore determine one motion estimation vector, two motion estimation vectors, or more, depending on the case, which point to different images.

The generated motion estimation vector or vectors output from the motion estimation unit 110 will be supplied to the Inter/Merge/Skip mode prediction unit 104 for the generation of Inter prediction vectors. Each Inter prediction vector can in fact be generated from a corresponding motion estimation vector.

The following is a more detailed description of motion estimation for a current block according to some embodiments.

The motion estimation may consist of analyzing the displacement of blocks between two images by exploiting the temporal correlation between the pixels. For a given block in the current image (the "current block" or "original block"), motion estimation is used to select the most similar block (referred to as the "reference block") in a previously encoded image, called the "reference image", representing the motion of that block for example using a two-dimensional vector (and therefore two components respectively representing for example a horizontal displacement and a vertical displacement).

The motion estimation method is not a standard and is therefore likely to differ from one encoder to another.

For example, the motion estimation method may include searching a more or less extensive area of the reference image, for example defined on the basis of the block of the reference image corresponding to the original block in the original image, in order to test the similarity of the original block to a larger or smaller number of candidate blocks of the reference image.

The correlation between a block and its displacement according to a motion estimation vector can be calculated using the Sum of Absolute Differences (SAD):

$$SAD = \Sigma_x \Sigma_y |p_{xy} - p'_{xy}| \quad (1)$$

where $p_{xy}$ is the pixel at position (x, y) of the original block and $p'_{xy}$ is the pixel at position (x,y) of the reference block. A low SAD will be interpreted as an indication that the two blocks are very similar.

The vector resulting from the motion estimation, corresponding to the block of the reference image closest to the original block among the candidate blocks tested in the reference image, can serve as a basis for determining an Inter prediction vector. Indeed, depending on the implementation, the Inter prediction method can include optimizations aiming to select a vector distinct from the vector from the motion estimation, in order to have a prediction as inexpensive as possible for the mode being tested.

This optimization may include for example testing one or more vectors around the vector from the motion estimation which are likely to give a better result for the desired objective. The vector used for Inter prediction involving a given reference image will then not necessarily be identical to the vector from the motion estimation for this reference image.

When Inter mode is selected for encoding the current block, one can typically send the decoder the pixel residual (calculated for each Inter prediction vector based on the pixels of the current block and the pixels of the block pointed to by the Inter prediction vector considered) and information concerning the corresponding Inter prediction vector or vectors.

However, the Inter prediction vector or vectors can represent a significant cost in video encoders. Some encoders reduce this coding cost by exploiting the vectors of neighboring blocks of the block being encoded. This optimization involves prediction of the Inter prediction vector or vectors, like the prediction of the Intra prediction mode in the case of predictive coding of the block in Intra mode.

As indicated above, information concerning each Inter prediction vector can thus be reduced in size by sending, instead of vector coordinates for example, an index of a predictor vector in a dictionary known to the encoder and decoder, and a residual quantifying the distance between the prediction vector and the predictor vector.

For example, in H.264/AVC coders, a median predictor vector $mv_{pred}$ is used to predict the vector to be coded my:

$$\varepsilon_{mv} = mv - mv_{pred} \quad (2)$$

Only the residual $\varepsilon_{mv}$ is sent in the encoded stream, which greatly reduces the coding costs.

The principle used in the HEVC standard is similar in that it includes the transmission of a vector residual $\varepsilon_{mv}$, although this is not calculated using a median predicted vector. In fact, the standard specifies a method for calculating a set of predicted vectors. The encoder then selects a predictor among these possible predicted vectors. It can then send, with the vector residual, an index number of the selected predictor vector, so that the decoder can use the same one.

The bidirectional prediction technique typically involves a weighted average of two Inter type predictions. The encoder selects a set of prediction parameters for a "direction" (for a first reference image), then for a second "direction" (for a second reference image, distinct from the first reference image). The encoder then determines whether to retain one of the two directions or both, in which case an average of the two generated predictions is determined before calculating a corresponding pixel residual which will eventually be processed by transformation and quantization.

The bidirectional prediction therefore corresponds in principle to an Inter type prediction with two predicted vectors. As a result, aspects of the proposed method for Inter prediction apply to bidirectional prediction.

Figure 4:
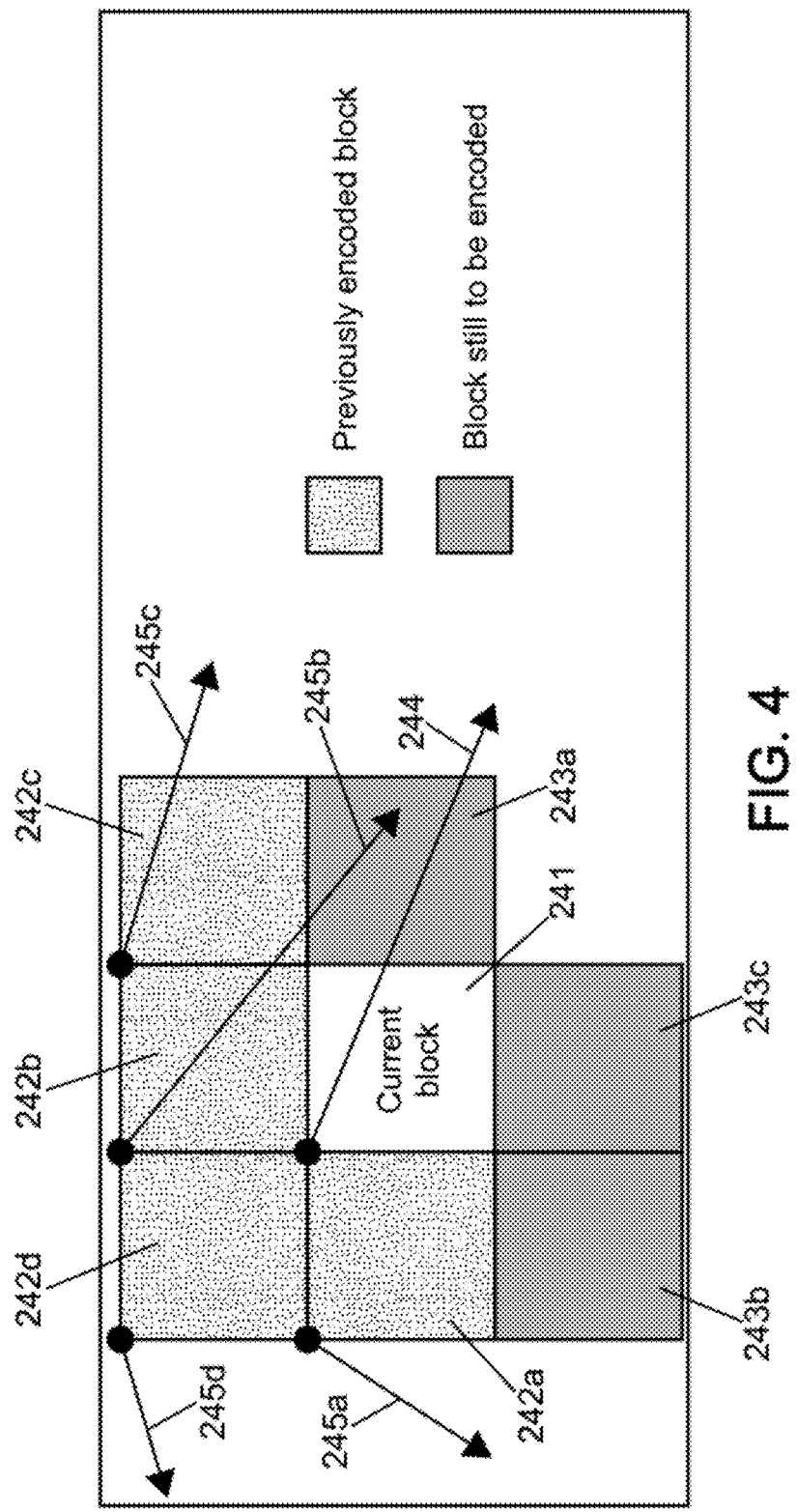
FIG. 4 is a diagram illustrating a determination of a median vector for coding in Inter prediction mode.

FIG. 4 illustrates the determination of a predictor vector which corresponds in the example shown to the median between the vectors of previously encoded neighboring blocks. Referring to FIG. 4, the current block (being encoded) 241 is surrounded by four previously encoded neighboring blocks 243a, 243b, 243c, 243d and three neighboring blocks 243a, 243b, 243c still to be encoded.

The example assumes an encoding path through the blocks of the image such that, for each block being encoded, the blocks to the left or above the current block have already been encoded, so the previously encoded neighboring blocks 243a, 243b, 243c, 243d are located to the left 243a or above 243b, 243c, 243d the current block 241 in FIG. 4. The predictor vector $mv_{pred}$ 244 of the current block 241 corresponds to the median between the respective vectors 245a, 245b, 245c, 245d of the previously encoded blocks 243a, 243b, 243c or 243a, 243b, 243d when block 243c is for example not available (for example when block 243c is encoded according to predictive coding in Intra mode). An incorrect predictor vector will lead to additional coding costs for the current block 241. In another particular case where only one or two neighboring blocks are encoded in Inter mode, the H.264/AVC and HEVC standards provide rules for using one of the available vectors since the median is not calculable.

Some coders use, sometimes in the context of "Inter" prediction mode, a mode referred to in some video coders as "Skip" mode in which, as is the case in Inter mode, the current block is predicted using pixels from previously encoded images (one or two images, or even more depending on the implementation). Skip mode is also sometimes presented as a sub-mode of Inter mode, because it corresponds to an "Inter" prediction mode without transmission (or generation in the encoded stream) of a prediction vector or pixel residual.

The Skip method is applicable when the pixel residual is small enough that it is considered unnecessary to send it in the stream exiting the coder.

In addition, with a view to minimizing the coding cost, the prediction vector or vectors used for this mode are typically not sent to the decoder, and will be deduced by the decoder from a predetermined list of possible vectors (referred to as "predictor vectors" as they are in "Inter" mode), which will enable for example sending only the position of the predictor vector (for example a position index in the list of predictor vectors) instead of sending its value (for example its coordinates). For example, in this coding mode, a predictor vector is directly selected from a predetermined list known to the decoder, the predictor vector being selected based on the previously encoded neighboring blocks of the current block. As noted above, in cases where the Skip and Inter modes implemented in the coder each use a list of predictor vectors, the respective lists of predictor vectors are not necessary identical, either in size or in content.

The HEVC standard specifies another mode of predictive coding known as "Merge", similar to the Skip mode described above except that a pixel residual can be transmitted. Merge mode can thus also correspond to an Inter prediction mode, without the transmission (or generation in the encoded stream) of a prediction vector, but a pixel residual is generated and transmitted in the encoded stream.

In the hardware architecture of an FPGA-based encoder, the reference images are usually stored in a large amount of memory which can hold a set of multiple images. For example, storing 10 images in HD format with 1920×1080 pixels with 4:2:2 8-bit sampling requires 40 MB of storage space. Memories used for this storage generally have moderate performance in terms of bandwidth. This is typically about 2 GB/s in the case of a DDR3-1333 SDRAM memory module. For example, with a read efficiency of 70% for large quantities of burst data, we have a bandwidth of 1,333,333,333 Hz×16 bits×0.7, which is 1.7 GB/s.

Figure 5:
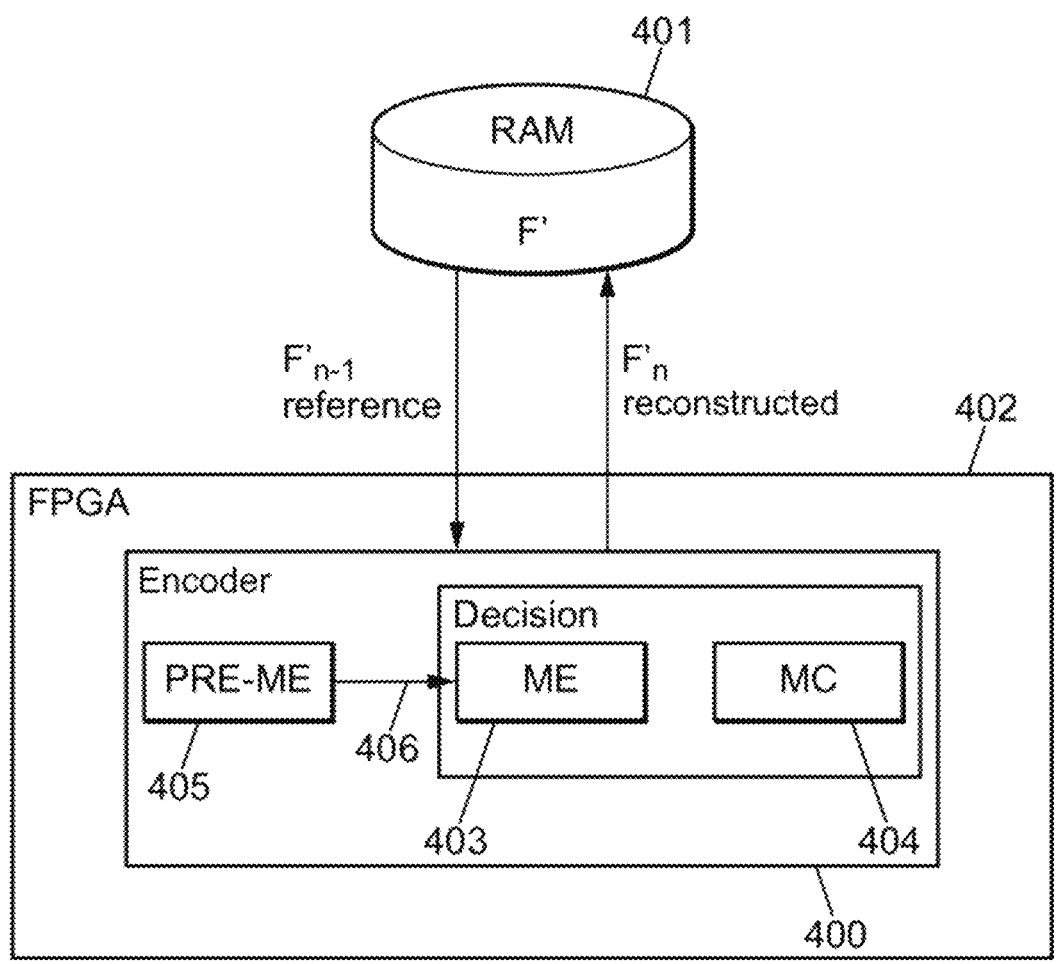
FIG. 5 is a diagram illustrating an encoder architecture using an FPGA component and an external memory.

FIG. 5 illustrates a hardware architecture of this type, where an encoder 400 implemented in an FPGA-type component 402 stores reference images in RAM 401. For example, to encode image $F_n$ of an input video stream F, the encoder may perform a motion estimation phase in an Inter, Skip, or Merge type of prediction, which will require reading reference data (denoted $F_{n-1}'$) in the storage RAM 401. Once the processing relating to Inter prediction has been performed, the encoder may store in RAM 401 the data (denoted $F_{n-1}'$) of the encoded image reconstructed based on the decision made, for use when encoding subsequent images in the video stream. The encoder 400 may therefore be provided with a motion estimation unit (ME) 403 and a motion compensation unit (MC) 404, the motion estimation unit 403 possibly also being configured to process data generated by a motion pre-estimation unit 405, for example data 406 relating to candidate motion vectors as explained above with reference to FIG. 2.

The amount of reference data ($F_{n-1}'$) required for the functions of the motion estimation unit (ME) 403 and the motion compensation unit (MC) 404 of the encoder 400 may be sufficiently large to consider using a cache system, in particular in order to achieve the performance required in a hardware implementation of real-time processing.

Depending on the implementation, this amount of data can be significantly greater than the amount of data corresponding to a single image, particularly because of the number of candidate vectors tested, the increase in the pixel area required for refining the candidates (ME portion of the processing), and the increase in the pixel area required for calculating the Inter prediction (MC portion of the processing).

The following considers these three causes of the sharp increase in reference data:

The area required for calculating the inter prediction of an encoding block (for example a macroblock) is equal to the size of this block increased by two rings, one required for interpolation to the quarter pixel, and the other required for the displacement of the motion estimation.

Indeed, depending on the implementation of the video encoding, the motion vectors can be determined to a fraction of a pixel, as a motion vector may point to a fractional pixel element generated between two neighboring pixels. In this case, fractional samples will be generated between two adjacent samples, for example by interpolation between the two samples. This is the case in the HEVC standard, which provides the generation of fractional luminance samples by defining an 8-tap interpolation filter for half-sample (or half-pixel) positions and a 7-tap interpolation filter for quarter-sample (or quarter-pixel) positions. The HEVC standard thus allows generating motion vectors with an accuracy equal to a fourth of the distance between two luminance samples.

The use of motion vectors pointing to a reference image with sub-pixel precision thus leads to interpolating the pixels of the original reference image, which increases the amount of data corresponding to that image. For example, to calculate an Inter prediction of a macroblock 16 pixels×16 pixels in size, which corresponds to a motion vector with quarter-pixel accuracy, it may be necessary to have an area of the reference image that is 19×19 pixels: a ring of three pixels is used in calculating an image to the half-pixel, the quarter-pixel calculation of the image being done by interpolating the half-pixel image. This increase in the amount of data representing a reference image can thus result from using interpolation filters to calculate the half-pixels (HPels) and possibly the quarter-pixels (QPels), depending on the desired level of granularity.

Figure 6A:
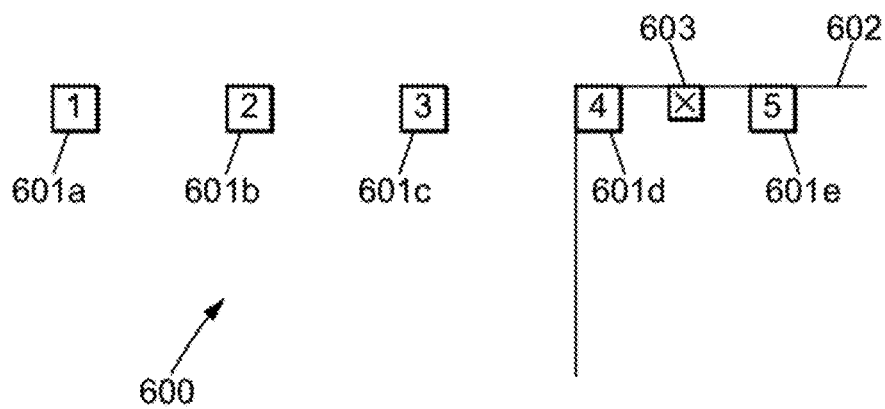
FIG. 6a is a diagram illustrating a fractional pixel position determined within the context of an Inter prediction according to one embodiment.

Depending on the implementation, one can for example use 5-tap filtering to calculate a half-pixel. It is then necessary to know the values of five pixels in order to implement the 5-tap interpolation filter. FIG. 6a illustrates this calculation, and shows five pixels 601a-601e of a reference image 600. Pixels 601d and 601e are part of an encoding block 602 being encoded by Inter prediction. By using a 5-tap interpolation filter, the calculation of the half-pixel 603 between pixels 601d and 601e can use, depending on the implementation, the values of the five pixels 601a-601e.

Moreover, as explained above, the motion estimation function may include, depending on the implementation, testing a set of vectors close to an initial vector called a candidate vector, and choosing from the tested vectors a vector minimizing a correlation function (often SAD or SSD) between the prediction block and the block to be encoded. In an implementation using a motion pre-estimation unit, this operation refines the candidate vectors identified by the motion pre-estimation function.

This set of test vectors increases the reference area necessary for the encoding decision in Inter mode. FIG. 6c illustrates this increase by showing a set of pixels covering an area of 5×5 pixels which ultimately requires (including the ring needed for quarter-pixel interpolation) an area of 21×21 pixels.

Figure 6B:
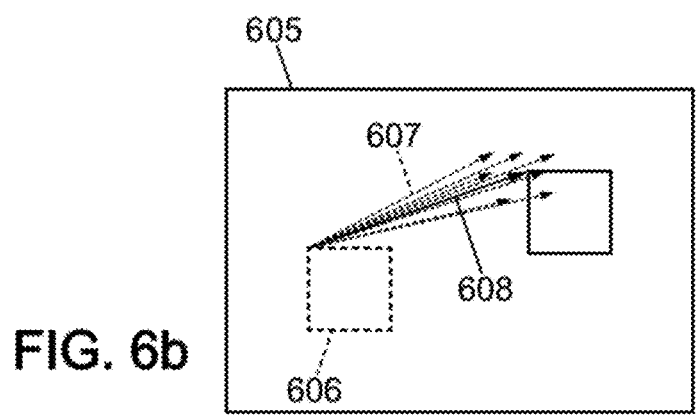
FIGS. 6b and 6c are diagrams illustrating a candidate motion vector and a set of tested vectors in the context of an Inter prediction according to one embodiment.
Figure 6C:
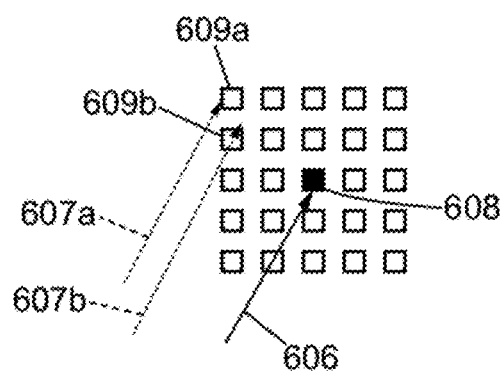

FIG. 6b shows a reference image 605 in which is represented block 606 co-located in the reference image 605 with the encoding block being encoded in the current image. A candidate vector 608 points to a pixel (half-pixel or quarter-pixel depending on the level of granularity selected) of the reference image 605, and a set 607 of test vectors respectively point to pixels (half-pixels or quarter-pixels depending on the level of granularity selected) of the reference image 605.

retrieved from RAM for the processing requirements of Inter prediction.

Some encoding standards, such as standard H.264/AVC and H.265/HEVC, allow partitioning a block to be encoded in order to divide the Inter prediction into multiple areas each having a specific vector. This allows a better correspondence between the macroblock to be encoded and the reference image, especially at object edges having different motions.

However, this partitioning accordingly increases the number of candidate vectors that one may wish to test in the encoder for an encoding block, and thus the amount of data required for the decision regarding Inter prediction of an encoding block.

This amount of data increases with the number of partitions. For example, partitioning a block of 16 pixels×16 pixels into four partitions of 8 pixels×8 pixels requires four areas of 13 pixels×13 pixels, for a total area of 52 pixels×52 pixels.

The H.264 standard allows several partitionings of a macroblock of 16 pixels×16 pixels, down to a partitioning into blocks of 4 pixels×4 pixels.

One can also consider the possibility, allowed in certain standards (such as the H.264/AVC and H.265/HEVC standards), of bidirectional Inter predictions which are two weighted Inter predictions calculated on two different reference images, as described above.

Finally, one can also take into account the increase in the amount of data required for the decision regarding Inter prediction, due to the alignment in external memory which is not always accessible (depending on the implementation) to the nearest pixel. Typically this increases the ring by 3 pixels (thus reaching a ring of 8 pixels: 3+2+3).

The following table details the amount of data to be read in order to make the Inter decision in the case of four partitionings (16×16, 8×16, 16×8, 8×8) for two references (L0 and L1), for the luminance component (Y) only. We thus reach a ratio of ×24 in reads per macroblock for H.264/AVC, as shown in the following table (the dimensions of the partitions and areas are expressed in number of pixels):

| Candidate | Number of partitions | Partition height | Partition width | Area height | Area width | Number of pixels in area | Number of pixels per macroblock | Ratio per MB |
|---|---|---|---|---|---|---|---|---|
| L0 16 × 16 | 1 | 16 | 16 | 24 | 24 | 576 | 576 | 2.3 |
| L0 16 × 8 | 2 | 16 | 8 | 24 | 16 | 384 | 768 | 3.0 |
| L0 8 × 16 | 2 | 8 | 16 | 16 | 24 | 384 | 768 | 3.0 |
| L0 8 × 8 | 4 | 8 | 8 | 16 | 16 | 256 | 1024 | 4.0 |
| L1 16 × 16 | 1 | 16 | 16 | 24 | 24 | 576 | 576 | 2.3 |
| L1 16 × 8 | 2 | 16 | 8 | 24 | 16 | 384 | 768 | 3.0 |
| L1 8 × 16 | 2 | 8 | 16 | 16 | 24 | 384 | 768 | 3.0 |
| L1 8 × 8 | 4 | 8 | 8 | 16 | 16 | 256 | 1024 | 4.0 |
| | | | | | Total: | | 6272 | 24.5 |

FIG. 6c shows the end of candidate vector 606 and the pixel 608 to which this vector 606 points, as well as two test vectors 607a and 607b and the pixels 609a and 609b to which these vectors 607a and 607b respectively point. Depending on the implementation of the motion estimation refining function, the set of pixels to which the test vectors respectively point (referred to as "pixels of test vectors" in FIG. 6c) must be included in the data of the reference image With this ratio we obtain an amount of data for 1080p60 encoding which exceeds the capacity of a DDR3-1333 memory module (1.7 GB/s at 70% efficiency). When we also consider the chrominance reads and the need to write reference images, magnified by the fact that the "random" access considered above degrades read performance (closing and opening a page) due to the partitioning of the areas to be loaded and their alignment to the pixel, we see the need for a system that minimizes accesses to external RAM without degrading the quality of the decision.

The use of a cache memory, meaning a memory space often internal to the component (for example ASIC or FPGA) in which the video encoder is implemented, which offers a much more efficient bandwidth for reads than an external memory, makes it possible to overcome this bandwidth limitation of external memory.

For example, a cache can be implemented in an Altera Stratix-III FPGA component (EP3SL340) using 32 internal M144K memories which can each contain up to 2048 words of 72 bits. By using a 133 MHz bus of 16×8 pixels for the output of this cache, a bandwidth of about 16 GB/s is obtained, which is an improvement by a factor of 9 over the external memory described above.

Figure 7:
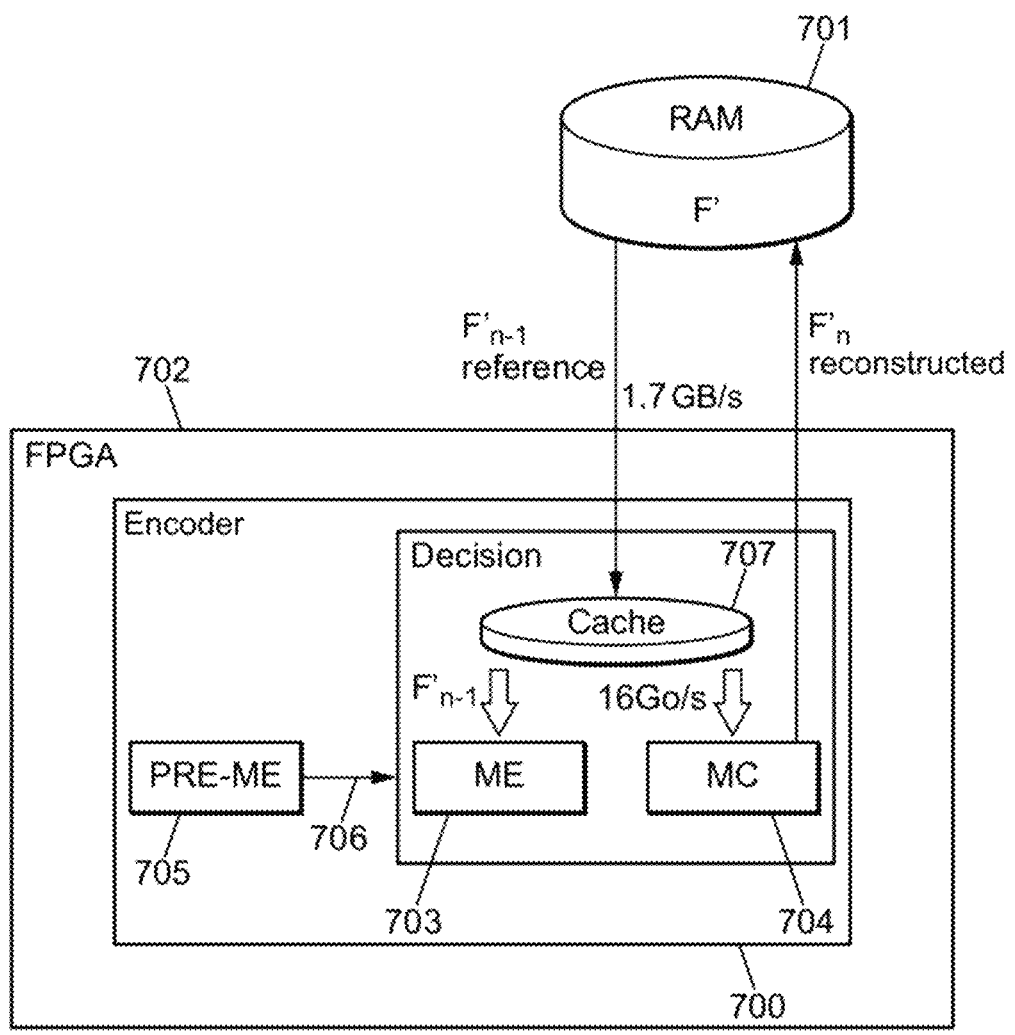
FIG. 7 is a diagram illustrating an encoder architecture for the implementation of the proposed method.

FIG. 7 shows an implementation of the encoder implemented in an FPGA component illustrated in FIG. 4, using a cache within the Inter prediction decision unit. An encoder 700 is implemented in an FPGA component 702, and it stores reference images F' in RAM 701 external to the FPGA component 702. For encoding an image $F_n$ of an input video stream F, the encoder 700 may perform a motion estimation phase as part of an Inter, Skip, or Merge type of prediction, and read reference data (denoted $F_{n-1}'$) from a cache 707 implemented in the FPGA component 702 (and not in the RAM storage 701 as it is in the architecture illustrated in FIG. 4). Once the processing relating to Inter prediction is done, the encoder 700 can store, in the external RAM 701, data (denoted $F_n'$) of the encoded image reconstructed from the decision made, for use when encoding subsequent images in the video stream. The encoder 700 may therefore be provided with a motion estimation unit (ME) 703 and a motion compensation unit (MC) 704, configured to read reference data in a local cache 707 rather than from an external memory 701. The motion estimation unit 703 may also be configured to apply processing to data generated by a motion pre-estimation unit 705, for example data 706 relating to candidate motion vectors as explained above with reference to FIG. 2.

In one or more embodiments, the type and efficiency of the cache, as well as the complexity of its implementation, will preferably be chosen based on the coherence between the different areas required for the motion estimation and motion compensation.

Different types of cache can be considered. In "Hit-Miss" caches, the requested data will be obtained quickly if already in the cache (the "hit" case), otherwise must be searched for in external memory then stored in the cache (the "miss" case). The latency when obtaining data will therefore be variable depending on whether or not the desired data is already in the cache.

In "systematic" caches, the data required to process a block for encoding will be preloaded into the cache for the macroblock being processed. In particular, an area surrounding the block co-located in the reference image with the block being encoded may be preloaded into the cache.

In the example of a video encoder implemented in an FPGA component to encode a plurality of blocks in parallel, using a systematic cache may be preferred to a Hit-Miss cache because the systematic cache provides an almost invariable latency for obtaining the data during the parallel encoding of multiple blocks.

In one or more embodiments, we will therefore consider a bounded search area to be pre-loaded into a cache, defined according to the encoding path followed for the blocks to be encoded.

Two factors may be taken into account when defining the amount of data to be prefetched into the cache: firstly, the height of the search area, which will be tied to the maximum vertical component allowed for the ME and MC vectors, and secondly, the number of blocks to be processed simultaneously, meaning in parallel.

Figure 8A:
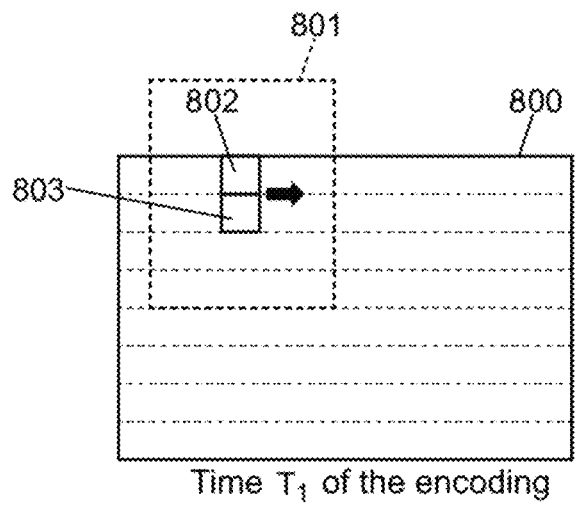
FIGS. 8a, 8b, 8c, 8d, 8e, and 8f are diagrams illustrating the loading of data into cache memory for the encoding of a pair of encoding blocks.
Figure 8B:
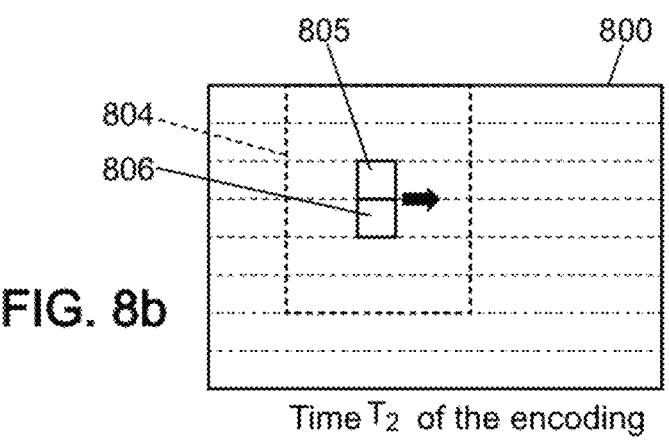

FIGS. 8a and 8b illustrate these two factors and show the case of two blocks encoded in parallel at different encoding times $T_1$ and $T_2$, where a search area covering the data required to process the two blocks must be preloaded in the cache.

FIG. 8a shows the data search area 801 of a reference image 800 which it is possible to preload into the cache considering its size, for the two blocks 802 and 803 corresponding to two blocks of the current image to be encoded in parallel, and FIG. 8b shows the data search area 804 of the reference image 800 to preload into the cache for the two blocks 805 and 806 corresponding to two blocks of the current image to be encoded in parallel after the two blocks 802 and 803 (for a block encoding path that runs from left to right and top to bottom, as indicated by the black arrow in FIGS. 8a and 8b). The search areas 801 and 804 to be loaded into the cache are defined around blocks of the reference image that are co-located with the blocks to be encoded in parallel.

When the size of the encoding blocks is fixed, as is the case with macroblocks of the H.264 video encoding standard, the data of the reference image can be grouped into virtual rows, their height that of a block, as illustrated in FIGS. 8a to 8f which show a reference image 800 comprising eight virtual rows. Of course, depending on the embodiment and in particular on the size of the images to be encoded as well as the various possible sizes of the blocks to be encoded, the virtual rows may have different heights, and the images to be encoded may have a different number of virtual rows than is illustrated in FIGS. 8a-8f which show an example implementation of the proposed method.

FIGS. 8c-8f illustrate the loading into cache memory of a reference image 800 for different pairs of blocks encoded in parallel.

Figure 8C:
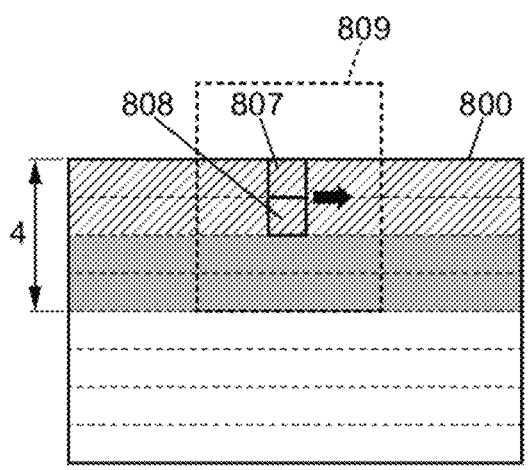

FIG. 8c shows two blocks 807 and 808 co-located in the reference image 800 with blocks to be encoded in parallel located in the upper part of the current image (first and second virtual rows). The size of the search area 809 to be loaded into cache memory is such that the encoding of two virtual rows of the current image leads to loading four virtual rows of the reference image into cache memory.

Figure 8D:
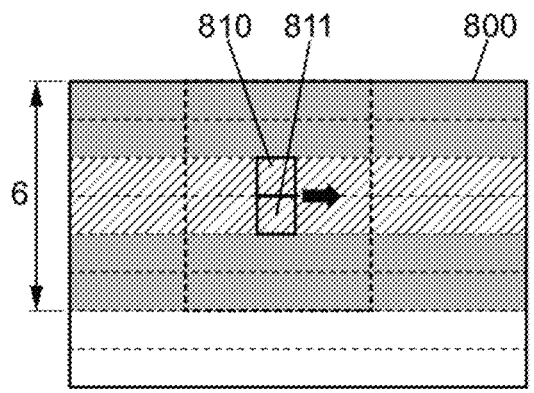

FIG. 8d illustrates the loading into cache memory of six virtual rows for the encoding of two blocks 810 and 811 co-located in the reference image 800 with blocks to be encoded in parallel located in the third and fourth virtual rows of the current image.

Figure 8E:
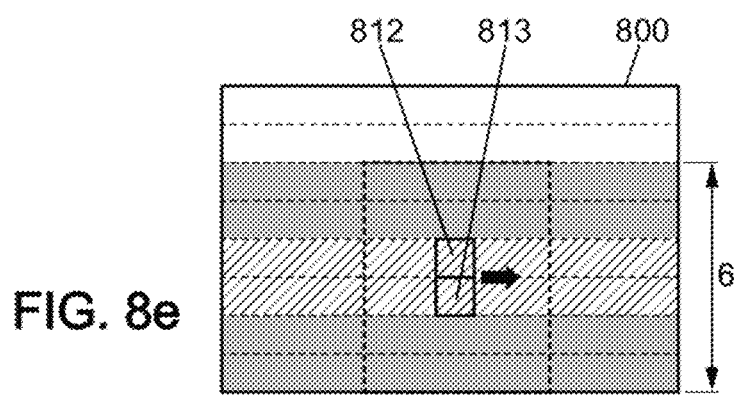

FIG. 8e illustrates the loading into cache memory of six virtual rows for the encoding of two blocks 812 and 813 co-located in the reference image 800 with blocks to be encoded in parallel located in the fifth and sixth virtual rows of the current image.

Figure 8F:
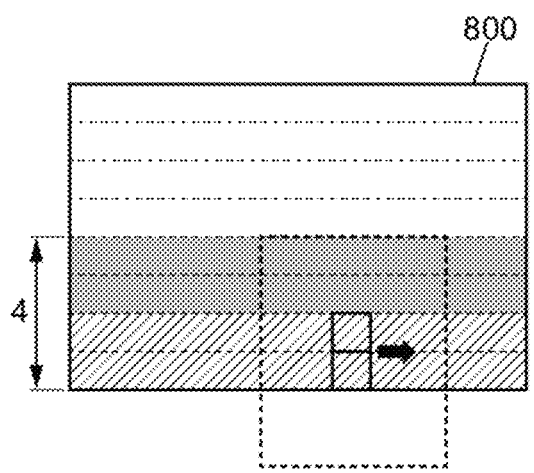

FIG. 8f illustrates the loading into cache memory of four virtual rows for the encoding of two blocks 814 and 815 co-located in the reference image 800 with blocks to be encoded in parallel located in the seventh and eighth virtual rows of the current image.

Thus, the amount of data loaded into cache memory in order to encode the set of blocks of a current image, the encoding being performed in parallel for sets of two blocks, corresponds to 20 times the width of a reference image of a height equal to eight virtual rows, the height of a virtual row corresponding to that of a block to be encoded, as shown in the following formula:

Width_Reference_Image×(4+6+6+4)=20×Width_Reference_Image

As the size of the reference image considered in the examples illustrated in FIGS. 8a to 8f is Width_Reference_Image×8, the encoding of the blocks of a current image results in reading 2.5 times the data of the reference image.

The following table shows the case of encoding a 1080p60 image, with a search area corresponding to a vertical displacement of 96 pixels (which is 6 encoding blocks 16×16 pixels in size), the encoding being performed with parallel processing of four encoding blocks:

|  | Image Width (MB) | | | | | | | | | | | | | | | | 120 |
|---|---|---|---|---|---|---|---|---|---|---|---|---|---|---|---|---|---|
|  | Image Height (MB) | | | | | | | | | | | | | | | | 68 |
|  | Max vertical displacement of vectors (MB) | | | | | | | | | | | | | | | | 6 |
|  | Number of MB processed in parallel | | | | | | | | | | | | | | | | 4 |
| Position Ymin of MBs processed in // (MB) | 0 | 4 | 8 | 12 | 16 | 20 | 24 | 28 | 32 | 36 | 40 | 44 | 48 | 52 | 56 | 60 | 64 |
| Position Ymax of MBs processed in // (MB) | 3 | 7 | 11 | 15 | 19 | 23 | 27 | 31 | 35 | 39 | 43 | 47 | 51 | 55 | 59 | 63 | 67 |
| Position Ymin of SA (MB) | 0 | 0 | 2 | 6 | 10 | 14 | 18 | 22 | 26 | 30 | 34 | 38 | 42 | 46 | 50 | 54 | 58 |
| Position Ymax of SA (MB) | 9 | 13 | 17 | 21 | 25 | 29 | 33 | 37 | 41 | 45 | 49 | 53 | 57 | 61 | 65 | 67 | 67 |
| Height of loaded SA (MB) | 10 | 14 | 16 | 16 | 16 | 16 | 16 | 16 | 16 | 16 | 16 | 16 | 16 | 16 | 16 | 14 | 10 |
| Total height of loaded SA (MB) | | | | | | | | 256 | | | | | | | | | |
| Image ratio | | | | | | | | 3.76 | | | | | | | | | |

The table uses the following acronyms and notations: MB: macroblock, SA: Search area, //: parallel, and Y: vertical position (expressed in number of MB).

One will note that the reference image is read 3.76 times. If we take into account two references for bidirectional predictions, this means an amount of data equivalent to 7.5 images, an increase of 3.6 compared to the 27 images of the table of FIG. 11. These 7.5 images represent 0.88 GB/s for a frame rate of 60 frames per second when considering only the luminance, and a rate of 1.76 GB/s when also considering chrominance.

There is therefore some gain in bandwidth compared to direct and "random" access to external memory, subject to a limitation of the vector components of the coded motion.

The proposed method described below allows reducing the impact of this limitation without complicating the implementation or requiring additional resources.

The search area conventionally used in encoder implementations utilizing a cache into which the data of a search area for motion estimation vectors is preloaded, is a square or more generally a rectangular area, to better reflect the aspect ratio of the reference image.

For example, with 32 M144K memories (which corresponds to 66% of the M144K memories of an Altera Stratix-3 EP3SL340 component) used in 16 k×8 bits, in other words to store $2^{14}$ words ($2^{14}$=16384) each 8 bits in size, we have 512 k×8 bits=512 k pixels (with 4:2:2 sampling of the luminance and chrominance), which is $2^{19}$ pixels, which corresponds to encoding blocks that are 16×16 pixels in size (512 k pixels/(16×16×2)=1024 16×16 Y-UV blocks, for an encoding block comprising Y and UV components, which is 16×16 Y+8×16 U+8×16 V in 4:2:2 sampling). For an implementation with parallel encoding of four encoding blocks and a vertical displacement of vectors of six encoding blocks, we obtain a search area of 64 MB×16 MB for a single reference image, and 32 MB×16 MB for two reference images in the case of bidirectional prediction, the size of the search area being defined in macroblocks (MB), for example 16×16 pixels in size for the Y luminance component, the size of the chrominance components U and V depending on the sampling of these components.

Figure 9A:
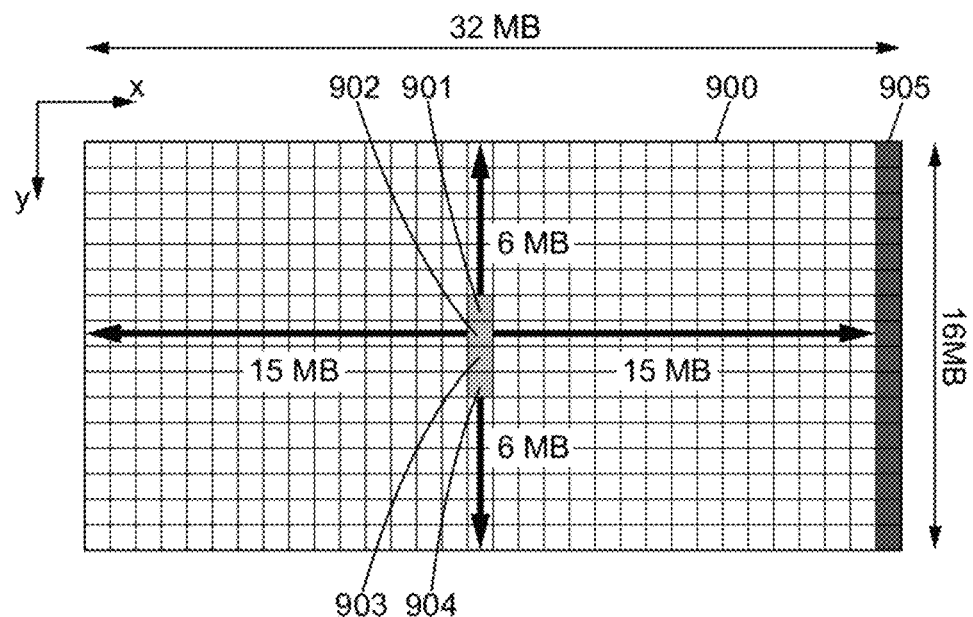
FIG. 9a is a diagram illustrating the loading of data into cache memory for the encoding of a group of four encoding blocks.

Referring to FIG. 9a, considering that a column of pre-loaded encoding blocks is required in order not to interrupt the processing flow downstream, for the example described above a displacement of vector components is obtained (without taking into account reductions due to the rings described above) of 15 MB×6 MB, which is +/−240 pixels x+/−96 pixels. Indeed, to parallel process blocks 901, 902, 903, and 904, it is desirable to have the unshaded search area in FIG. 9a. If the encoding algorithm waits until the end of processing these four blocks to release the column at the far left of the search area, and to load column 905 in order to advance to processing the four adjacent blocks to the right of the four blocks being encoding, the loading of column 905 will generate idle time in the processing. In one or more embodiments, column 905 can be pre-loaded to prevent this discontinuity in the processing.

FIG. 9a shows a search area 900 to be loaded into a cache memory, rectangular in shape and defined around four blocks 901-904 in a reference image which correspond to blocks co-located with four blocks of a current image being encoded in parallel. The horizontal displacement of the components of the motion vectors corresponds, with the parameters described above and corresponding to a particular embodiment, to a cache memory of 15 MB, or 15 blocks in width, while the vertical displacement of the components of the motion vectors corresponds, with the parameters described above, to a cache memory of 6 MB, or six blocks in height (which is 6×16=96 pixels). A column of additional encoding blocks 905 may also be pre-loaded so as not to interrupt the processing flow downstream as described above.

The search area 900 fills 32×16 MB of memory, or 512 MB, which corresponds to the memory available for an implementation of the cache memory using 32 M144K memories of the Altera Stratix-3 EP3SL340 component (as listed above) and implementing the loading into cache memory of two search areas respectively corresponding to two reference images for a prediction by temporal correlation that is bidirectional (for example a bidirectional Inter prediction).

The addressing of this memory is not very complex since it is sufficient to add an offset to the x position of the desired block, the offset being a function of the "strip" being processed (the "strip" corresponding to the set of rows containing the blocks being processed), to take the five LSB bits of this result, and to combine them with the four LSB bits of the y position of the requested block, to obtain a 9-bit address (512 MB).

Figure 9B:
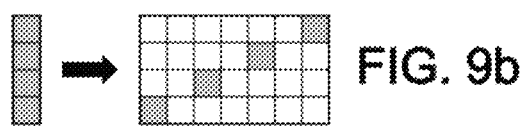
FIGS. 9b and 9c are diagrams illustrating the configuration of a group of four encoding blocks to be encoded in parallel.

The configuration of the encoding blocks currently being encoded in parallel illustrated in FIG. 9a by the group of four blocks 901-904 of the reference image respectively co-located with encoding blocks of the current image, may advantageously be replaced by what is called a "staircase" configuration, illustrated in FIG. 9b, in order to take into account encoding dependencies for each of the blocks being encoded.

Indeed, as noted above, the prediction of a block according to Intra prediction mode or Inter prediction mode may involve already-encoded neighboring blocks, in the current image, of the encoding block. For Inter prediction, depending on the embodiment, one can try to predict the motion estimation vector using the vectors determined for the neighboring blocks, if any, as they are already encoded. For Intra prediction, depending on the embodiment, one can predict the pixels of the block currently being encoded (current block) based on the pixels of one or more neighboring blocks. The definition of these neighboring blocks may therefore depend on the encoding path chosen for the blocks of the image.

Figure 9C:
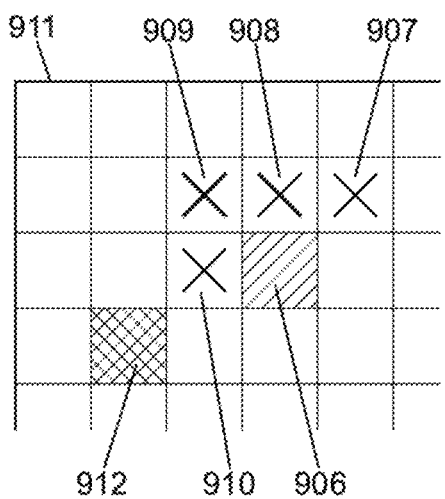
Figure 9D:
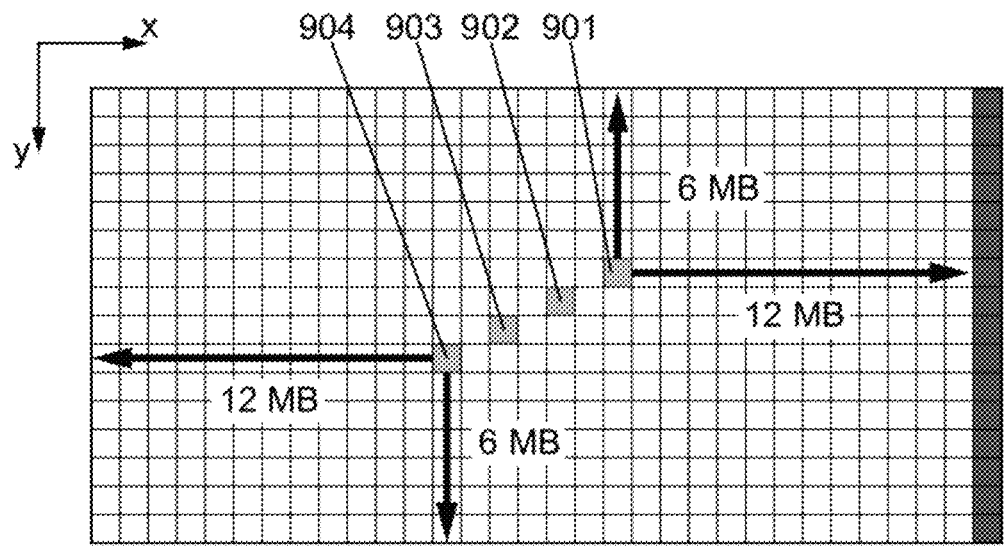
FIGS. 9d and 9e are diagrams illustrating the loading of data into cache memory for the encoding of a group of four encoding blocks.

The staircase configuration illustrated in FIGS. 9b, 9c, and 9d is provided as an exemplary configuration of a plurality of blocks to be encoded in parallel (or of corresponding blocks respectively co-located in a reference image), and positioned relative to each other so that none of the blocks of the configuration corresponds to a neighboring block of another block of the configuration usable for encoding said other block, for the encoding path chosen for the blocks of the image being encoded. Other staircase configurations can of course be used for implementing the proposed method.

FIG. 9c illustrates an encoding block 906 being encoded (current block) with four neighboring blocks 907-910 immediately adjacent to the current block 906. The four neighboring blocks are defined according to the encoding path of the blocks of the image 911 being encoded, which goes from left to right and top to bottom in the illustrated example. In this exemplary configuration, block 912, located immediately below and to the left of neighboring block 910 which is located immediately to the left of current block 906, is a block that can be encoded in parallel with the current block 906.

The use of a staircase configuration of a group of blocks to be encoded, in parallel such as the one illustrated in FIGS. 9b and 9c, results in a reduction of the displacement of the vector components in the corresponding search area to be pre-loaded into the cache.

For example, as illustrated in FIG. 9d, the search area 900 shown in FIG. 9a (horizontal displacement of 15 MB and vertical displacement of 6 MB) is reduced to a horizontal displacement of 12 MB due to the change from a vertical configuration of blocks to be encoded in parallel to a staircase configuration, a configuration reflected onto that of the corresponding blocks 901-904 respectively co-located in a reference image.

In addition, depending on the embodiment, the management of image edges can be done by data duplication or by using dedicated logic. Data duplication has the advantage of avoiding the cost of implementing logic dedicated to managing the edges of the image to be encoded.

Data duplication for the management of image edges can lead for example to defining a search area like the one shown in FIG. 9.

Figure 9E:
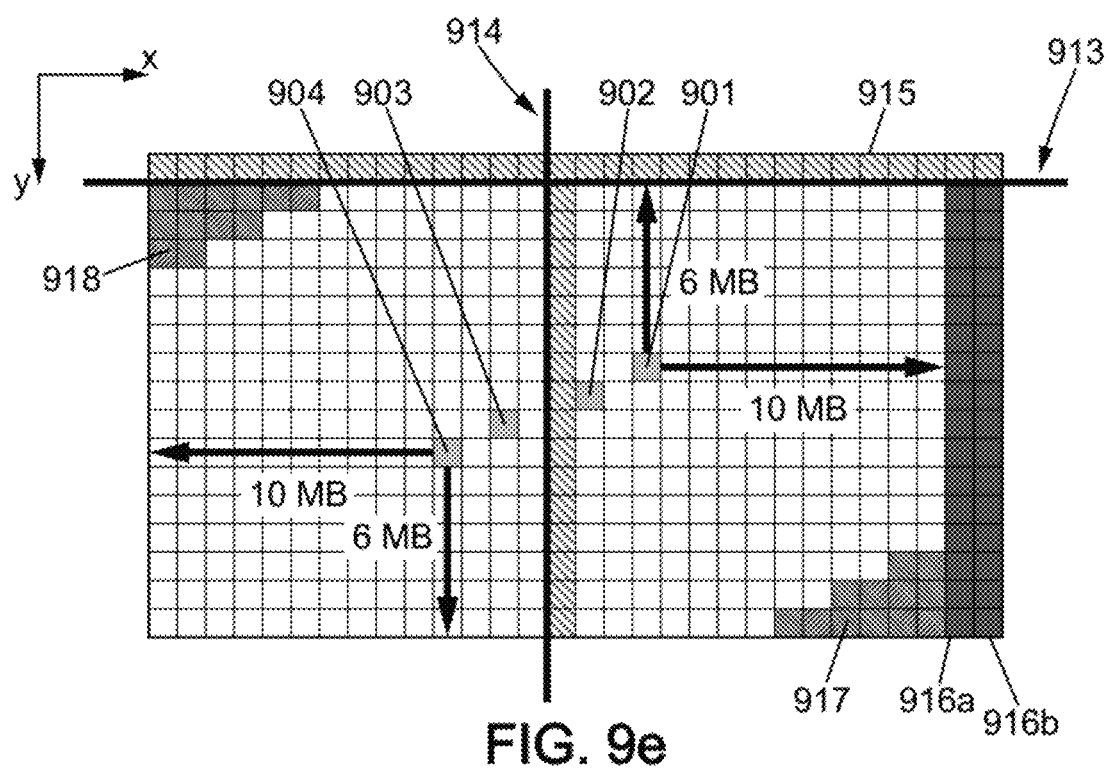

FIG. 9e shows a rectangular search area 915 to be pre-loaded into a cache in order to speed up the processing, related to prediction by temporal correlation, of four blocks to be encoded in parallel positioned in a staircase configuration. This staircase configuration is found in the four corresponding blocks 901-904 respectively co-located in a reference image shown in FIG. 9e. A row of blocks 913 and a column of blocks 914 are also copied into cache memory for the edge management of the reference image. The displacement of the vector components of the coded motion is limited to +1-160 pixels for the horizontal component, which corresponds to filling 2×10 MB of a cache, and to +1-96 pixels for the vertical component, which corresponds to filling 2×6 MB of a cache.

The search area 915 also includes two preloaded columns of blocks 916a-916b so as not to interrupt the processing flow downstream.

The search area 915 shown in FIG. 9e uses a total of 17×30 MB, which is 510 MB, of the 512 MB available in an implementation of the cache that uses 32 M144K memories of the Altera Stratix-3 EP3SL340 component (as indicated above) and that loads into the cache two search areas respectively corresponding to two reference images for a bidirectional prediction by temporal correlation (for example a bidirectional Inter prediction).

The inventors of the proposed method have noticed that the data of the sets of blocks 917 and 918, respectively located in the lower right and upper left portions of the search area 915, were not used by the processing related to motion estimation or motion compensation.

The proposed method overcomes this disadvantage by optimizing the shape of the search area to be loaded into the cache, in a manner that minimizes the amount of data loaded into the cache and not used in the subsequent processing related to motion estimation or motion compensation.

In addition, the proposed method advantageously allows increasing the displacement of vector components without increasing the complexity of the implementation nor the use of significant additional resources.

Figure 10:
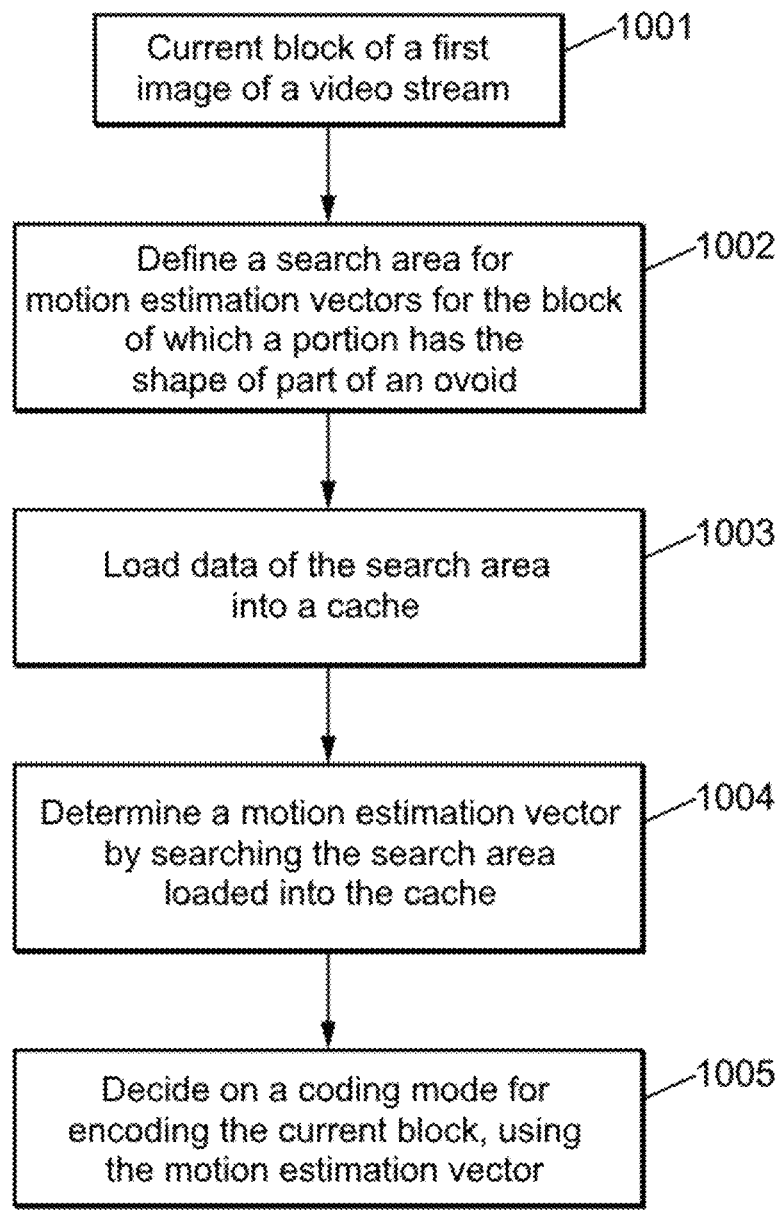
FIG. 10 is a flowchart illustrating the proposed method according to one embodiment.

FIG. 10 is a flowchart illustrating the proposed method according to one embodiment.

A first image in a set of images of a video sequence is considered.

This first image is divided into blocks to which the image encoding processing is applied. Each block is thus encoded according to one among a plurality of coding modes comprising at least one prediction by temporal correlation coding mode using a plurality of images from the set of images, such as the Inter, Merge, and Skip type predictions described above.

For a current block (currently being encoded) of the first image (1001), a search area is defined (1002) in a reference image in order to search for motion estimation vectors for the current block, of which at least a portion has substantially the shape of part of an ovoid. The reference image used is chosen to be distinct from the image being encoded (first image), and to have previously been encoded according to an encoding sequence of images of the set of images.

The search area thus defined is a single search area in the sense that it is defined for an encoding block currently being encoded.

The data of the search area are then loaded (1003) into a cache, and a motion estimation vector pointing to a block of the search area correlated to the current block is determined (1004) by searching within the search area loaded in the cache.

A decision to encode the current block according to one of the coding modes is then made (1005) using the motion estimation vector.

The proposed method thus uses a search area which is not defined to have a rectangular or square shape.

The square search area, and its rectangular equivalent to follow the aspect ratio of the image, corresponds to the use of the infinity vector norm to define a search area. Infinity vector norm is understood to mean a vector norm defined by the following relation: $\|\vec{v}\|_\infty = \max(v_x, v_y)$, where $v_x$ and $v_y$ are two components of vector $\vec{v}$, of infinity norm $\|\vec{v}\|_\infty$.

The use of an ovoid shape allows, among other things, avoiding the loading into cache of data that are not used by the algorithm for searching the search area for motion vectors.

In one or more embodiments, a search area is defined of which a portion is substantially ellipsoid in shape.

Figure 11A:
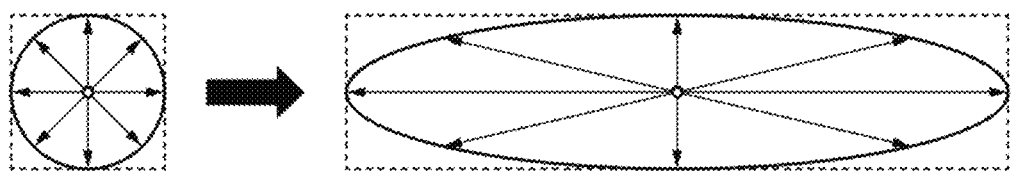
FIGS. 11a, 11b, 11c, 11d, 11e, 11f, 11g, 11h, and 11i are diagrams illustrating different search area configurations in different implementations.

Indeed, if a quadratic vector norm is used to define the search area, defined by the following relation: $\|\vec{v}\|_\infty = \sqrt{v_x^2 + v_y^2}$, where $v_x$ and $v_y$ are two components of the vector i, of quadratic norm $\|\vec{v}\|_\infty$, we obtain a search area that is circular in shape. The equivalent of this circular shape that maintains the aspect ratio of the image is an ellipsoid shape as shown in FIG. 11a.

In one or more embodiments, the search area may have a general ovoid shape, or an ellipsoid shape in one particular embodiment. In the latter case, the outline of the search area defines a substantially elliptical polygon.

In one or more embodiments, the shape of the single search area is predetermined. Indeed, one or more shapes for the single search area may be pre-saved. For example, shape definition data (ovoid, ellipsoid, or other) can be loaded from memory in order to define the search area. Once loaded, this shape is predetermined for all image(s) of a sequence to be encoded.

In one embodiment, these shape definition data may define a curve corresponding to a portion or to all of the search area.

Figure 11B:
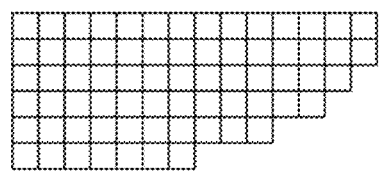

For example, in the case of a search area that is substantially ellipsoid in shape, the ellipse may be defined in a quarter of the space, as illustrated in FIG. 11b, based on the shape definition data loaded into memory.

Figure 11C:
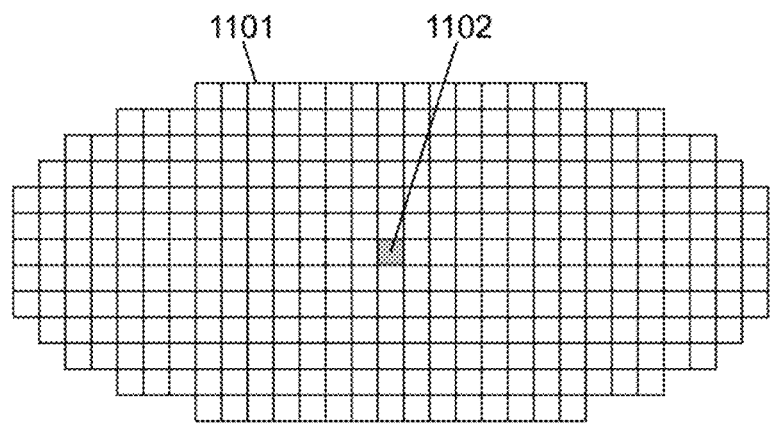

In one embodiment, the search area (1101) can then be defined for a block (1102) co-located in the selected reference image with the current block being encoded, by applying the shape defined for one of the four quadrants, as illustrated in FIG. 11c.

Figure 11D:
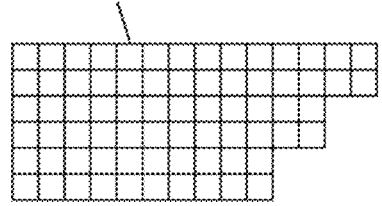
Figure 11E:
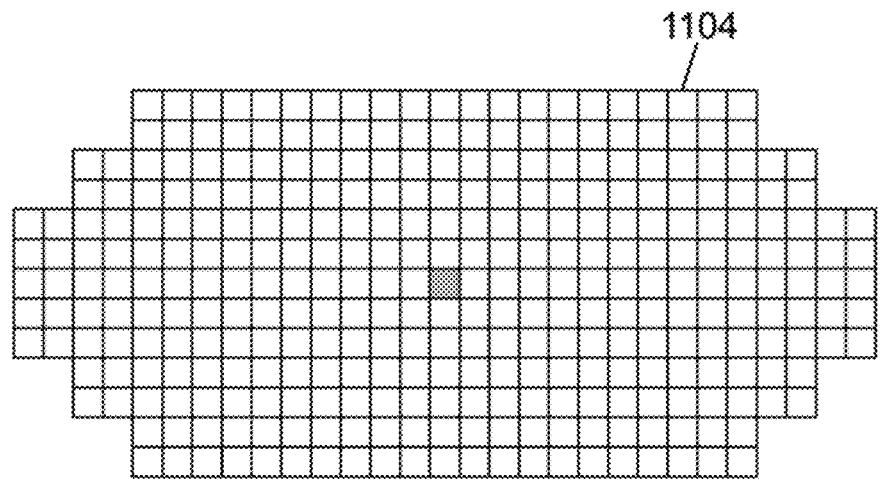
Figure 11F:
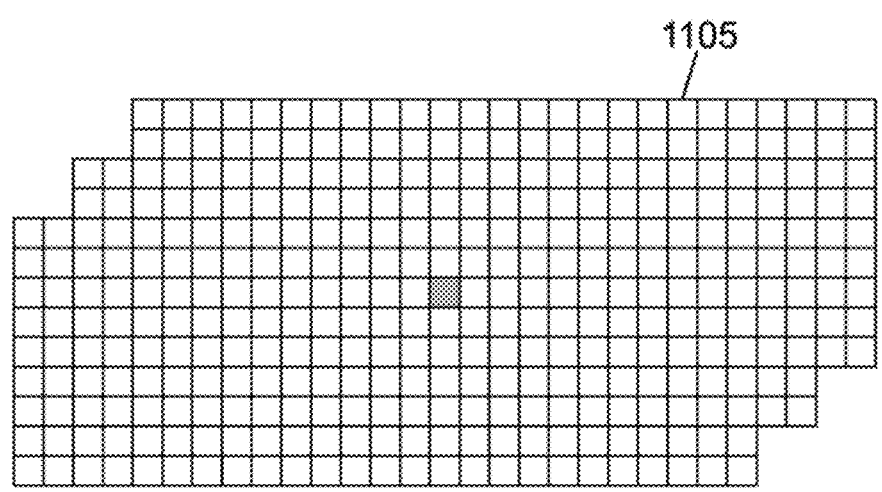

FIGS. 11d, 11e, and 11f show other exemplary search areas (1104) and (1105) defined from part of an ovoid (1103) used to define the search area in a quarter of the space.

In one or more embodiments in which the implementation of the encoder provides for encoding a plurality of encoding blocks in parallel, a multiple search area is defined that combines the single search areas respectively definable for each encoding block encoded in parallel.

Figure 11G:
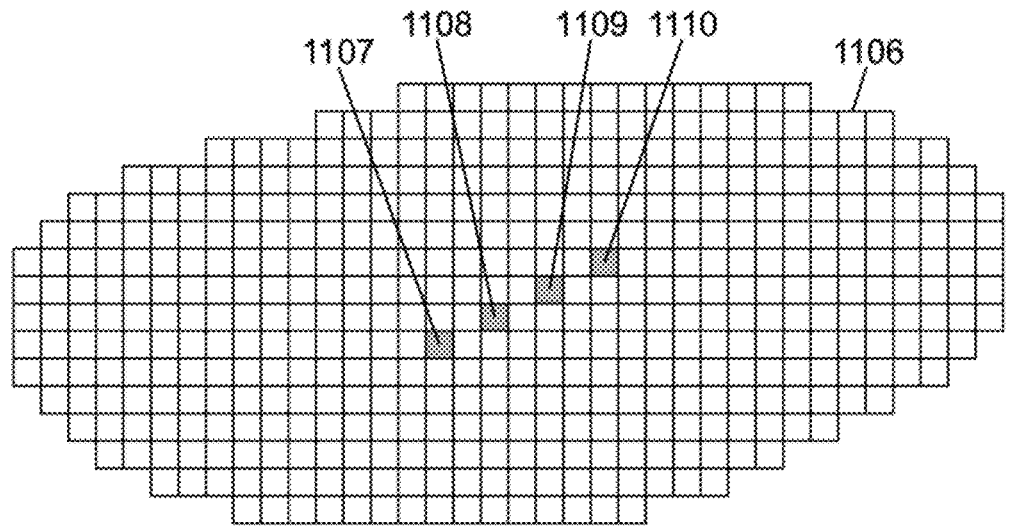

FIG. 11g shows a multiple search area (1106) combining the single search areas respectively corresponding to four blocks (1107-1110) respectively co-located in a reference image with four encoding blocks being encoded that are arranged in a staircase configuration as described above. In this example, the multiple search area is defined based on a definition of a single search area having an ellipsoid shape of the type illustrated in FIG. 11c.

Depending on the encoding path chosen, the loading into the cache of a search area for a new encoding block to be encoded may, in one or more embodiments, be defined by a series of horizontal offset values (denoted delta x or $\Delta_x^{charge}(y)$) respectively corresponding to each of the possible values of the vertical coordinate of the blocks of the search area, determined based on the shape of the search area to be loaded into the cache.

Similarly, in the case of a multiple search area, the loading into the cache of the multiple search area for a new set of four encoding blocks to be encoded may, in one or more embodiments, be defined by a series of horizontal offset values (denoted delta x or $\Delta_x^{charge}(y)$) respectively corresponding to each of the possible values of the vertical coordinate of the blocks of the search area, determined based on the shape of the search area to be loaded into the cache and according to the encoding path through the blocks of the current image.

Figure 11H:
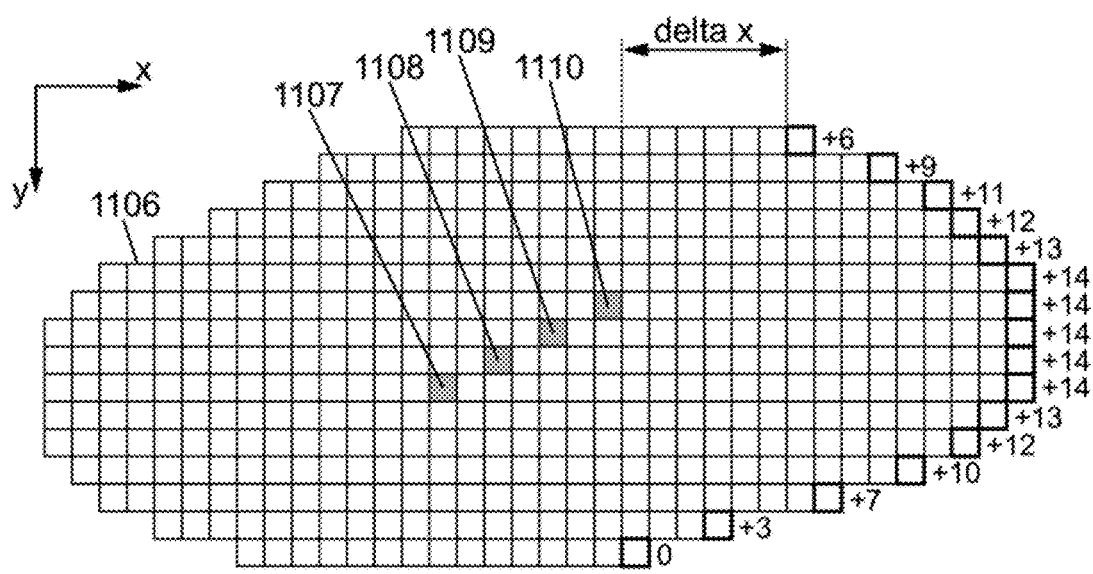

FIG. 11h illustrates a set of offset values $\Delta_x^{charge}(y)$ for the multiple search area illustrated in FIG. 11g. In this example, the values $\Delta_x^{charge}(y)$ respectively correspond to the 16 possible coordinate values in the vertical direction. In the example illustrated in FIG. 11h, the offset values $\Delta_x^{charge}(y)$ are determined relative to the position of one (1110) of the four blocks (1107-1110) co-located with the blocks being encoded in parallel, which is selected as a reference block. Of course, in one or more embodiments, another among the four blocks (1107-1110) co-located with the block being encoded in parallel, or another block of the multiple search area 1106, could be used as a reference block. For example, one can use as a reference block the one among the four blocks (1107-1110) which results in the lowest offset values $\Delta_x^{charge}(y)$, in order to minimize the memory required to store them.

In one embodiment, the offset values $\Delta_x^{charge}(y)$ can be stored in a memory, for example ROM, which does not significantly degrade the access performance of the DDR3 controller compared to the random access of a cacheless system, because the memory read requests relate to entire blocks (for example 512 bytes, aligned to the size of a macroblock in the case of an H.264/AVC encoder). Indeed, in one embodiment in which each pair $(x, \Delta_x^{charge}(y))$ corresponds to a 16×16 macroblock (512 bytes with 4:2:2 8-bit sampling) which is 32 aligned words in DDR3, access to entire 16×16 MB blocks (corresponding to 32 contiguous addresses) is more efficient than access to random addresses.

Referring to the exemplary embodiment illustrated in FIG. 11h, the values of $\Delta_x^{charge}(y)$ for each vertical position y, for example ranging from 0 to 15, are summarized in the table below (the values of $\Delta_x^{charge}(y)$ being natural numbers):

| y | $\Delta_x^{charge}(y)$ |
|---|---|
| 0 | 0 |
| 1 | +3 |
| 2 | +7 |
| 3 | +10 |

| y | $\Delta_x^{charge}$ (y) |
|---|---|
| 4 | +12 |
| 5 | +13 |
| 6 | +14 |
| 7 | +14 |
| 8 | +14 |
| 9 | +14 |
| 10 | +14 |
| 11 | +13 |
| 12 | +12 |
| 13 | +11 |
| 14 | +9 |
| 15 | +6 |

Similarly, the release of the area of cache memory for a block whose encoding has ended may, in one or more embodiments, be defined by a series of horizontal offset values (denoted delta_lib_x or $\Delta_x^{lib}$(y)) respectively corresponding to each of the possible values of the vertical coordinate of blocks of the search area updated in the cache, which are determined based on the shape of the search area loaded into the cache and according to the encoding path selected.

In the case of a multiple search area, the release of the area of cache memory for a set of four encoding blocks whose encoding has ended may, in one or more embodiments, be defined by a series of horizontal offset values (denoted delta_lib_x or $\Delta_x^{lib}$(y)) respectively corresponding to each of the possible values of the vertical coordinate of blocks of the search area, which are determined based on the shape of the search area loaded into the cache and according to the encoding path through the blocks of the current image.

Figure 11I:
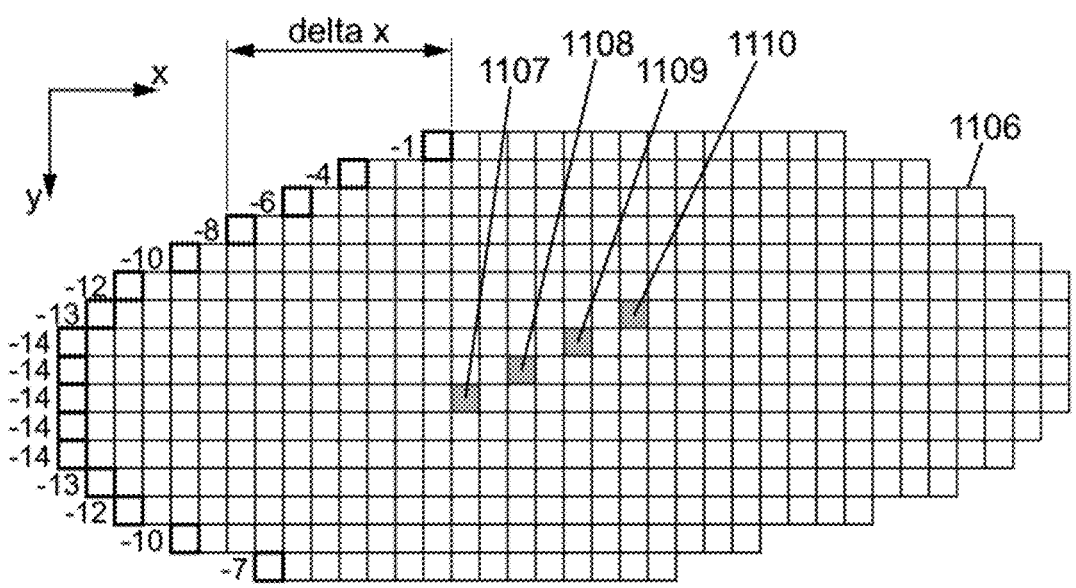

FIG. 11i illustrates a set of offset values $\Delta_x^{lib}$(y) for the multiple search area illustrated in FIG. 11g. In this example, the offset values $\Delta_x^{lib}$(y) respectively correspond to the 16 possible coordinate values in the vertical direction. In the example illustrated in FIG. 11i, the offset values $\Delta_x^{lib}$(y) are determined relative to the position of one (1107) of the four blocks (1107-1110) which are co-located with the blocks being encoded in parallel, selected as a reference block. Of course, in one or more embodiments, another among the four blocks (1107-1110) which are co-located with the blocks being encoded in parallel, or another block of the multiple search area 1106, could be used as a reference block. For example, one can use as a reference block the one among the four blocks (1107-1110) which results in the lowest offset values $\Delta_x^{lib}$(y), in order to minimize the memory required for their storage.

Similarly to the loading offset values, in one embodiment the release offset values $\Delta_x^{lib}$(y) may be stored in a memory, for example ROM.

Referring to the embodiment illustrated in FIG. 11i, the release offset values $\Delta_x^{lib}$(y) for each vertical position y, for example ranging from 0 to 15, are summarized in the table below (the values of $\Delta_x^{lib}$(y) being integers):

| y | $\Delta_x^{lib}$ (y) |
|---|---|
| 0 | −7 |
| 1 | −10 |
| 2 | −12 |
| 3 | −13 |
| 4 | −14 |
| 5 | −14 |
| 6 | −14 |
| 7 | −14 |
| 8 | −14 |
| 9 | −13 |
| 10 | −12 |
| 11 | −10 |
| 12 | −8 |
| 13 | −6 |
| 14 | −4 |
| 15 | −1 |

The invention thus provides a gain in coding efficiency in comparison to a rectangular systematic cache, since, for the same amount of memory internal to the FPGA, it allows greater displacement of the vectors. This improvement in the displacement of the motion vector components is due to the gain in the amount of memory unnecessarily loaded with a rectangular cache, as illustrated by memory portions 917 and 918 in FIG. 9, and is also due to the ovoid search area which allows larger vectors in the horizontal and vertical directions, and smaller ones in the diagonal directions, due to the use in some embodiments of the quadratic norm $\|\vec{v}\|_2$ instead of the infinity norm.

Depending on the chosen embodiment, certain acts, actions, events, or functions of each of the methods described herein may be carried out or occur in a different order from the order described, or may be added, merged, or may not be carried out or occur, as appropriate. Additionally, in some embodiments, some acts, actions, or events are carried out or occur concurrently and not sequentially.

Although described through a number of detailed exemplary embodiments, the proposed encoding method and the equipment for implementing the method include various variations, modifications, and improvements which will be apparent to those skilled in the art, provided that these variations, modifications, and improvements lie within the scope of the invention as defined by the following claims. In addition, various features and aspects described above may be implemented together or separately, or may be substituted for one another, and all of the different combinations and sub-combinations of the features and aspects lie within the scope of the invention. In addition, some of the systems and equipment described above may not incorporate all of the modules and functions described for the preferred embodiments.

The invention claimed is:

1. A method for encoding a first image in a set of images, the first image divided into blocks, and each block being encoded according to one among a plurality of coding modes that includes at least one prediction by temporal correlation coding mode utilizing a plurality of images from the set of images, the method comprising, for a current block of the first image:
    defining, in a second image of the set of images that is distinct from the first image and previously encoded according to a predefined encoding sequence for the images of the set of images, a single search area for motion estimation vectors;
    loading data of the single search area into a cache memory;
    determining a motion estimation vector of the current block by searching the single search area loaded in the cache memory, the motion estimation vector pointing to a block of the search area correlated to the current block; and using the motion estimation vector to decide the encoding of the current block according to one among the plurality of coding modes,
wherein the single search area comprises a set of data of the second image comprising data of a block of the second image that is co-located with the current block, and
wherein at least a portion of the single search area has substantially a shape of an ovoid portion.

2. The encoding method according to claim 1, wherein the single search area has a substantially ovoid shape.

3. The encoding method according to claim 1, wherein at least a portion of the single search area has substantially the shape of an ellipsoid portion.

4. The encoding method according to claim 3, wherein the single search area has a substantially ellipsoid shape.

5. The encoding method according to claim 1, wherein the outline of the single search area defines a polygon of substantially elliptical shape.

6. The encoding method according to claim 1, further comprising:
defining a multiple search area for a plurality of encoding blocks by combining single search areas respectively corresponding to the encoding blocks of the plurality of encoding blocks;
loading data of the multiple search area into the cache memory;
determining, by searching the multiple search area loaded in the cache memory, a plurality of estimation vectors respectively corresponding to the encoding blocks of the plurality of encoding blocks; and
using the determined estimation vectors to encode the encoding blocks of the plurality of encoding blocks.

7. A device for encoding a first image in a set of images, comprising:
an input interface configured for receiving the first image; and
a video encoding unit operatively coupled to the input interface and configured to encode the first image by using the method according to claim 1.

8. A computer program, recorded on a non-transitory recording medium and loadable into a memory associated with a processor, and comprising portions of code that, upon execution by the processor, implements the steps of a method according to claim 1.

9. A set of data recorded on a non-transitory recording medium representing a computer program according to claim 8.

10. A non-transitory storage medium for a program executable by computer, comprising a set of data representing one or more programs, said one or more programs comprising instructions which, during the execution of said one or more programs by a computer comprising a processing unit operatively coupled to memory means and to an input/output interface module, cause the computer to encode a first image in a set of images according to the method of claim 1.

11. The encoding method according to claim 2, wherein at least a portion of the single search area has substantially the shape of an ellipsoid portion.

12. A device for encoding a first image in a set of images, comprising:
an input interface configured for receiving the first image; and
a video encoding unit operatively coupled to the input interface and configured to encode the first image by using the method according to claim 2.

13. A device for encoding a first image in a set of images, comprising:
an input interface configured for receiving the first image; and
a video encoding unit operatively coupled to the input interface and configured to encode the first image by using the method according to claim 3.

14. A device for encoding a first image in a set of images, comprising:
an input interface configured for receiving the first image; and
a video encoding unit operatively coupled to the input interface and configured to encode the first image by using the method according to claim 4.

15. A device for encoding a first image in a set of images, comprising:
an input interface configured for receiving the first image; and
a video encoding unit operatively coupled to the input interface and configured to encode the first image by using the method according to claim 5.

16. A device for encoding a first image in a set of images, comprising:
an input interface configured for receiving the first image; and
a video encoding unit operatively coupled to the input interface and configured to encode the first image by using the method according to claim 6.

17. A non-transitory storage medium for a program executable by computer, comprising a set of data representing one or more programs, said one or more programs comprising instructions which, during the execution of said one or more programs by a computer comprising a processing unit operatively coupled to memory means and to an input/output interface module, cause the computer to encode a first image in a set of images according to the method of claim 2.

18. A non-transitory storage medium for a program executable by computer, comprising a set of data representing one or more programs, said one or more programs comprising instructions which, during the execution of said one or more programs by a computer comprising a processing unit operatively coupled to memory means and to an input/output interface module, cause the computer to encode a first image in a set of images according to the method of claim 3.

19. A non-transitory storage medium for a program executable by computer, comprising a set of data representing one or more programs, said one or more programs comprising instructions which, during the execution of said one or more programs by a computer comprising a processing unit operatively coupled to memory means and to an input/output interface module, cause the computer to encode a first image in a set of images according to the method of claim 4.

20. A non-transitory storage medium for a program executable by computer, comprising a set of data representing one or more programs, said one or more programs comprising instructions which, during the execution of said one or more programs by a computer comprising a processing unit operatively coupled to memory means and to an input/output interface module, cause the computer to encode a first image in a set of images according to the method of claim 5.

* * * * *